US006693961B1

(12) United States Patent
Azadegan

(10) Patent No.: US 6,693,961 B1
(45) Date of Patent: Feb. 17, 2004

(54) SYSTEM AND METHOD OF VIDEO FRAME MEMORY REDUCTION OF VIDEO DECODERS

(75) Inventor: Faramarz Azadegan, San Diego, CA (US)

(73) Assignee: Conexant Systems, Inc., Newport Beach, CA (US)

(*) Notice: Subject to any disclaimer, the term of this patent is extended or adjusted under 35 U.S.C. 154(b) by 0 days.

(21) Appl. No.: 09/480,225

(22) Filed: Jan. 10, 2000

(51) Int. Cl.$^7$ .......................... H04B 1/66; A06K 9/36; H04N 7/12

(52) U.S. Cl. ............... 375/240.11; 382/248; 348/398.1; 348/419.1

(58) Field of Search ...................... 375/240.11, 240.19, 375/240.13, 240.15; 382/246, 232, 248, 276, 268, 254; 709/247; 348/398.1, 419.1

(56) References Cited

U.S. PATENT DOCUMENTS

| 5,590,222 A | * | 12/1996 | Kojima ........................ 382/268 |
| 5,633,684 A | * | 5/1997 | Teranishi et al. ...... 375/240.11 |
| 5,657,085 A | * | 8/1997 | Katto ....................... 348/398.1 |
| 5,777,678 A | * | 7/1998 | Ogata et al. ........... 375/240.11 |
| 5,949,912 A | * | 9/1999 | Wu ............................. 382/246 |
| 6,272,180 B1 | * | 8/2001 | Lei ........................ 375/240.16 |

OTHER PUBLICATIONS

Neri Merhav and Vasudev Bhaskaran, "Fast Alorithms for DCT-Domain Image Down-Sampling and for Inverse Motion Compensation", *IEEE Trans on CSVT*, vol. 7, No. 3, Jun. 1997.
Anthony Vetro and Huifang Sun, "On the Motion Compensation Within a Down-Conversion Decoder", submitted to *SPIE Journal Electronic Imaging*, Jun. 1997.
Huifang Sun, "Hierarchical Decoder for MPEG Compressed Video Data", *IEEE Trans on Consumer Electronics*, vol. 39, No. 3, Aug. 1993.

Jay Bao, Huifang Sun and Tommy C. Poon, "HDTV Down-Conversion Decoder", *IEEE Trans on Consumer Electronics*, vol. 42, No. 3, Aug. 1996.
Robert Mokry and Dimitris Anastassiou, "Minimal Error Drift in Frequency Scalability for Motion-Compensated DCT Coding", IEEE Trans on CSVT, vol. 4, No. 4, No. 4, Aug. 1994.
Anthony Vetro, Huifang Sun, Jay Bao and Tommy Poon, "Frequency Domain Down Conversion of HDTV Using Adaptive Motion Compensation", submitted to *Int'l Journal of Imaging Systems & Technology*, special issue on image.
Osama K. Al-Shaykh and Homer Chen, "Constrained HDTV decoders" Rockwell Science Center report.
Y. Arai, T. Agui, and M. Nakajima, "A Fast DCT-SQ Scheme For Images," *Trans. IEICE* vol. E 71, No. 11, p. 1095, Nov. 1988.

* cited by examiner

*Primary Examiner*—Gims Philippe
(74) *Attorney, Agent, or Firm*—Procopio, Cory, Hargreaves & Savitch, LLP

(57) ABSTRACT

Embodiments of the invention comprise a new device and method to realize an improved video frame memory reduction for a video decoder. In one embodiment, this improvement is achieved by a removal of the rate controller and the utilization of both a block compression technique and a fixed storage allocation technique, in order to lower the overall system cost, and to lower the frame memory requirements. In a preferred embodiment, this improvement is achieved by performing a hierarchical transform, for example, a Haar transform, that operates on the previously decoded frames. Then, the coefficients obtained from this transformation are quantized and then run-length coded, utilizing variable-length codes. The hierarchical transform preferably operates on an N×N block size with L levels of hierarchical decomposition, where N and L can be selected in advance. For example, in one preferred embodiment, N may equal 8, and L may equal 3. The compression system then fits the N×N block into an allocated storage of (N×N)/cf bytes, where cf designates the compression factor. For example, a nominal value of cf that equals 2, 3, or 4 may be utilized. The quantization process comprises a simple scaling of the coefficients. However, the DC coefficient is not scaled. The variable-length encoder comprises a run-length encoder that fits as many coefficients as is possible into the available space of the (N×N)/cf bytes.

37 Claims, 36 Drawing Sheets

T-Transform Equations

$A'_N = (A_N + B_N + C_N + D_N) / 4$ — 727

$B'_N = (A_N - B_N + (C_N - D_N)) / 4$ — 729

$C'_N = (A_N + B_N - (C_N + D_N)) / 4$ — 731

$D'_N = (A_N - B_N - (C_N - D_N)) / 4$ — 733

For N = 1-16

*Figure 7C*

|  |  |  |  |
|---|---|---|---|
| $A'_1$ | $A'_2$ | $A'_3$ | $A'_4$ |
| $A'_5$ | $A'_6$ | $A'_7$ | $A'_8$ |
| $A'_9$ | $A'_{10}$ | $A'_{11}$ | $A'_{12}$ |
| $A'_{13}$ | $A'_{14}$ | $A'_{15}$ | $A'_{16}$ |

↙ 735

|  |  |  |  |
|---|---|---|---|
| $A'_{17}$ | $B'_{17}$ | $A'_{18}$ | $B'_{18}$ |
| $C'_{17}$ | $D'_{17}$ | $C'_{18}$ | $D'_{18}$ |
| $A'_{19}$ | $B'_{19}$ | $A'_{20}$ | $B'_{20}$ |
| $C'_{19}$ | $D'_{19}$ | $C'_{20}$ | $D'_{20}$ |

↙ 737

|  |  |  |  |
|---|---|---|---|
| $A''_{17}$ | $A''_{18}$ | $B''_{17}$ | $B''_{18}$ |
| $A''_{19}$ | $A''_{20}$ | $B''_{19}$ | $B''_{20}$ |
| $C''_{17}$ | $C''_{18}$ | $D''_{17}$ | $D''_{18}$ |
| $C''_{19}$ | $C''_{20}$ | $D''_{19}$ | $D''_{20}$ |

↙ 739

T-Transform Equations $$A''_N = (A'_N + B'_N + C'_N + D'_N) / 4 \quad \text{— 741}$$
$$B''_N = (A'_N - B'_N + (C'_N - D'_N)) / 4 \quad \text{— 743}$$
$$C''_N = (A'_N + B'_N - (C'_N + D'_N)) / 4 \quad \text{— 745}$$
$$D''_N = (A'_N - B'_N - (C'_N - D'_N)) / 4 \quad \text{— 747}$$

For N = 17-20

| $A''_{17}$ | $A''_{18}$ |
|---|---|
| $A''_{19}$ | $A''_{20}$ |

753

| $A''_{21}$ | $B''_{21}$ |
|---|---|
| $C''_{21}$ | $D''_{21}$ |

755

| $A'''_{21}$ | $B'''_{21}$ |
|---|---|
| $C'''_{21}$ | $D'''_{21}$ |

T-Transform Equations

757

$A'''_N = (A''_N + B''_N + C''_N + D''_N) / 4$ — 749

$B'''_N = (A''_N - B''_N + (C''_N - D''_N)) / 4$ — 761

$C'''_N = (A''_N + B''_N - (C''_N + D''_N)) / 4$ — 763

$D'''_N = (A''_N - B''_N - (C''_N - D''_N)) / 4$ — 765

For N = 21

*Figure 7E*

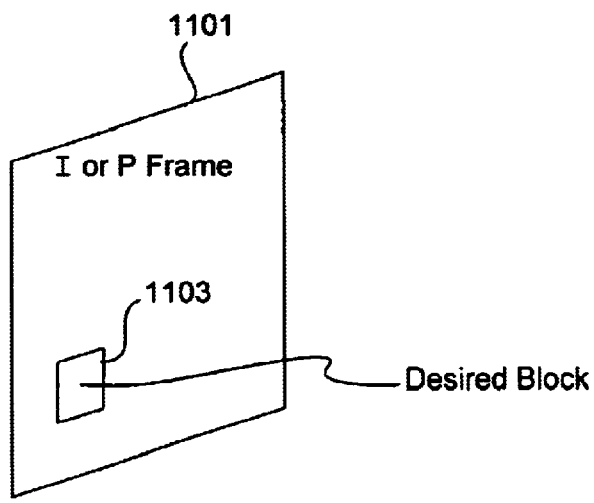
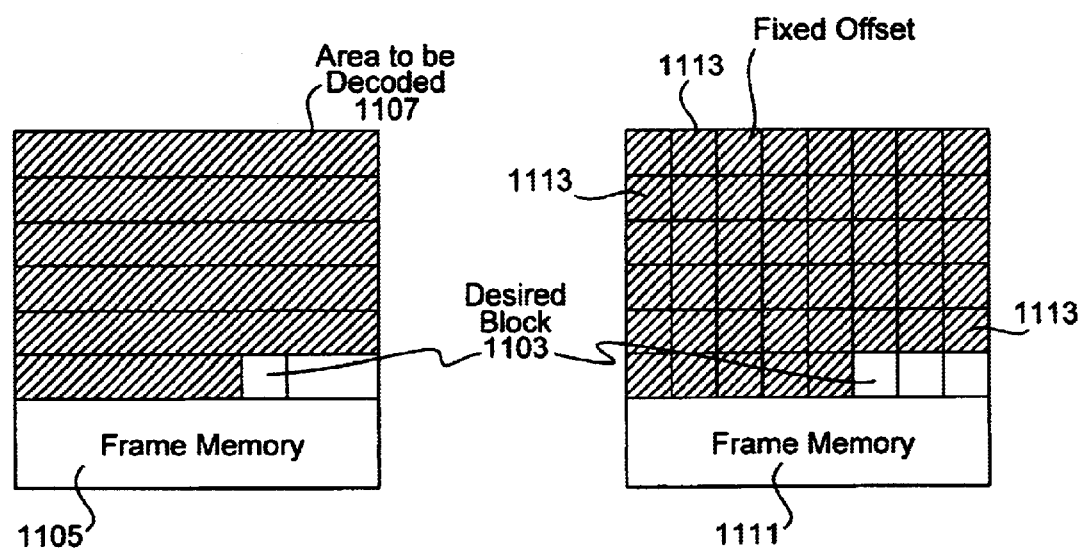
*Figure 11A*  *Figure 11B*

| | $b_7$ | $b_6$ | $b_5$ | $b_4$ | $b_3$ | $b_2$ | $b_1$ | $b_0$ | Decimal Value |
|---|---|---|---|---|---|---|---|---|---|
| 1300 | 1 | 1 | 1 | 1 | 1 | 1 | 1 | 1 | 255 |
| 1301 | 0 | 1 | 1 | 1 | 1 | 1 | 1 | 1 | 127 |
| 1303 | 0 | 0 | 1 | 1 | 1 | 1 | 1 | 1 | 63 |
| 1305 | 0 | 0 | 0 | 1 | 1 | 1 | 1 | 1 | 31 |
| 1307 | 0 | 0 | 0 | 0 | 1 | 1 | 1 | 1 | 15 |
| 1309 | 0 | 0 | 0 | 0 | 0 | 1 | 1 | 1 | 7 |
| 1311 | 0 | 0 | 0 | 0 | 0 | 0 | 1 | 1 | 3 |
| 1313 | 0 | 0 | 0 | 0 | 0 | 0 | 0 | 1 | 1 |

*Figure 13*

MPEG Macroblock 1501

| | Column 1 | Column 2 | Column 3 | Column 4 | Column 5 | Column 6 | Column 7 | Column 8 |
|---|---|---|---|---|---|---|---|---|
| Row 1 | $a_1$=151 | $b_1$=139 | 123 | 112 | 105 | 93 | 89 | 93 |
| Row 2 | $c_1$=136 | $d_1$=142 | 148 | 149 | 148 | 149 | 151 | 152 |
| Row 3 | 146 | 145 | 142 | 139 | 139 | 141 | 140 | 138 |
| Row 4 | 132 | 134 | 138 | 143 | 146 | 147 | 145 | 146 |
| Row 5 | 161 | 162 | 153 | 148 | 145 | 145 | 146 | 149 |
| Row 6 | 143 | 141 | 139 | 143 | 143 | 140 | 138 | 137 |
| Row 7 | 145 | 147 | 151 | 155 | 154 | 155 | 149 | 148 |
| Row 8 | 137 | 137 | 138 | 137 | 137 | 140 | 141 | 141 |

First Iteration of "T" Transform

1603 — $142 \sim (151+139+136+142)/4$
1605 — $1 \sim (151-139+(136-142))/4$
1607 — $3 \sim (151+139-(136+142))/4$
1609 — $-4 \sim (151+139+136+142)/4$

| | Col 1 | Col 2 | Col 3 | Col 4 | Col 5 | Col 6 | Col 7 | Col 8 |
|---|---|---|---|---|---|---|---|---|
| Row 1 | $a_1'$=142 | | | | $b_1'$=1 | | 1617 | |
| Row 2 | | | | | | | | |
| Row 3 | | | 1613 | | | | | |
| Row 4 | | | | | | | | |
| Row 5 | $c_1'$=3 | | | | $d_1'$=-4 | | | 1621 |
| Row 6 | | | 1619 | | | | | |
| Row 7 | | | | | | | | |
| Row 8 | | | | | | | | |

T' Matrix, 1623

*Figure 15*

1501 MPEG Macroblock

| | Column 1 | Column 2 | Column 3 | Column 4 | Column 5 | Column 6 | Column 7 | Column 8 |
|---|---|---|---|---|---|---|---|---|
| Row 1 | 151 | 139 | 123 | 112 | 105 | 93 | 89 | 93 |
| Row 2 | 136 | 142 | 148 | 149 | 148 | 149 | 151 | 152 |

| | Col 1 | Col 2 | Col 3 | Col 4 | Col 5 | Column 6 | Column 7 | Column 8 |
|---|---|---|---|---|---|---|---|---|
| Row 1 | $a_1'=142$ | $a_2'=133$ | $a_3'=123$ | $a_4'=121$ | 1 | 2 | 2 | -1 |
| Row 2 | | | | | | | | |
| Row 3 | | | | | | | | |
| Row 4 | | | | | | | | |
| Row 5 | 3 | -15 | -24 | -30 | 4 | 3 | 3 | 0 |
| Row 6 | | | | | | | | |
| Row 7 | | | | | | | | |
| Row 8 | | | | | | | | |

T' Matrix, 1703

*Figure 16*

1501 MPEG Macroblock

| | Column 1 | Column 2 | Column 3 | Column 4 | Column 5 | Column 6 | Column 7 | Column 8 |
|---|---|---|---|---|---|---|---|---|
| Row 1 | 151 | 139 | 123 | 112 | 105 | 93 | 89 | 93 |
| Row 2 | 136 | 142 | 148 | 149 | 148 | 149 | 151 | 152 |
| Row 3 | 146 | 145 | 142 | 139 | 139 | 141 | 140 | 138 |
| Row 4 | 132 | 134 | 138 | 143 | 146 | 147 | 145 | 146 |

| | Col 1 | Col 2 | Col 3 | Col 4 | Column 5 | Column 6 | Column 7 | Column 8 |
|---|---|---|---|---|---|---|---|---|
| Row 2 | $a_5'=139$ | $a_6'=140$ | $a_7'=143$ | $a_8'=142$ | 0 | 0 | 0 | 0 |
| Row 3 | | | | | | | | |
| Row 4 | | | | | | | | |
| Row 5 | 3 | −15 | −24 | −30 | 4 | 3 | 3 | 0 |
| Row 6 | 6 | 0 | 3 | 3 | 0 | 2 | 0 | 0 |
| Row 7 | | | | | | | | |
| Row 8 | | | | | | | | |

T' Matrix, 1703

*Figure 17*

1501
MPEG Macroblock

|  | Column 1 | Column 2 | Column 3 | Column 4 | Column 5 | Column 6 | Column 7 | Column 8 |
|---|---|---|---|---|---|---|---|---|
| Row 1 | 151 | 139 | 123 | 112 | 105 | 93 | 89 | 93 |
| Row 2 | 136 | 142 | 148 | 149 | 148 | 149 | 151 | 152 |
| Row 3 | 146 | 145 | 142 | 139 | 139 | 141 | 140 | 138 |
| Row 4 | 132 | 134 | 138 | 143 | 146 | 147 | 145 | 146 |
| Row 5 | 161 | 162 | 153 | 148 | 145 | 145 | 146 | 149 |
| Row 6 | 143 | 141 | 139 | 143 | 143 | 140 | 138 | 137 |

|  | Col 1 | Col 2 | Col 3 | Col 4 | Column 5 | Column 6 | Column 7 | Column 8 |
|---|---|---|---|---|---|---|---|---|
| Row 3 | $a_9'$=151 | $a_{10}'$=145 | $a_{11}'$=143 | $a_{12}'$=142 | 0 | 0 | 0 | 0 |
| Row 4 |  |  |  |  |  |  |  |  |
| Row 5 | 3 | -15 | -24 | -30 | 4 | 3 | 3 | 0 |
| Row 6 | 6 | 0 | 3 | 3 | 0 | 2 | 0 | 0 |
| Row 7 | 9 | 4 | 1 | 5 | 0 | 2 | 0 | 0 |
| Row 8 |  |  |  |  |  |  |  | -1 |

T' Matrix, 1703

*Figure 18*

1501 MPEG Macroblock

| | Column 1 | Column 2 | Column 3 | Column 4 | Column 5 | Column 6 | Column 7 | Column 8 |
|---|---|---|---|---|---|---|---|---|
| Row 1 | 151 | 139 | 123 | 112 | 105 | 93 | 89 | 93 |
| Row 2 | 136 | 142 | 148 | 149 | 148 | 149 | 151 | 152 |
| Row 3 | 146 | 145 | 142 | 139 | 139 | 141 | 140 | 138 |
| Row 4 | 132 | 134 | 138 | 143 | 146 | 147 | 145 | 146 |
| Row 5 | 161 | 162 | 153 | 148 | 145 | 145 | 146 | 149 |
| Row 6 | 143 | 141 | 139 | 143 | 143 | 140 | 138 | 137 |
| Row 7 | 145 | 147 | 151 | 155 | 154 | 155 | 149 | 148 |
| Row 8 | 137 | 137 | 138 | 137 | 137 | 140 | 141 | 141 |

| | Col 1 | Col 2 | Col 3 | Col 4 | Column 5 | Column 6 | Column 7 | Column 8 |
|---|---|---|---|---|---|---|---|---|
| Row 4 | $a_{13}'=141$ | $a_{14}'=145$ | $a_{15}'=146$ | $a_{16}'=144$ | 0 | 0 | 0 | 0 |
| Row 5 | 3 | -15 | -24 | -30 | 4 | 3 | 3 | 0 |
| Row 6 | 6 | 0 | 3 | 3 | 0 | 2 | 0 | 0 |
| Row 7 | 9 | 4 | 1 | 5 | 0 | 2 | 0 | -1 |
| Row 8 | 4 | 7 | 8 | 3 | 0 | -1 | 0 | 0 |

T' Matrix, 1703

*Figure 19*

2301, T' Matrix

|  | Column 1 | Column 2 | Column 3 | Column 4 | Column 5 | Column 6 | Column 7 | Column 8 |
|---|---|---|---|---|---|---|---|---|
| Row 1 | 142 | 133 | 123 | 121 | 1 | 2 | 2 | -1 |
| Row 2 | 139 | 140 | 143 | 142 | 0 | 0 | 0 | 0 |
| Row 3 | 151 | 145 | 143 | 142 | 0 | 0 | 0 | 0 |
| Row 4 | 141 | 145 | 146 | 144 | 0 | 0 | -1 | 0 |
| Row 5 | 3 | -15 | -24 | -30 | 4 | 3 | 3 | 0 |
| Row 6 | 6 | 0 | 3 | 3 | 0 | 2 | 0 | 0 |
| Row 7 | 9 | 4 | 1 | 5 | 0 | 2 | 0 | -1 |
| Row 8 | 4 | 7 | 8 | 3 | 0 | -1 | 0 | 0 |

2307
$138 \sim (142+133+139+140)/4$
2311
$-1 \sim (142+133-(139+140))/4$

2309
$2 \sim (142-133+(139-140))/4$

2313
$2 \sim (142-133-(139-140))/4$

|  | Col 1 | Col 2 | Col 3 | Col 4 | Column 5 | Column 6 | Column 7 | Column 8 |
|---|---|---|---|---|---|---|---|---|
| Row 1 | $a_1''=138$ |  | $b_1''=2$ |  | 1 | 2 | 2 | -1 |
| Row 2 |  |  |  |  | 0 | 0 | 0 | 0 |
| Row 3 | $c_1''=-1$ |  | $d_1''=2$ |  | 0 | 0 | -1 | 0 |
| Row 4 |  |  |  |  | 0 | 0 | 0 | 0 |
| Row 5 | 3 | -15 | -24 | -30 | 4 | 3 | 3 | 0 |
| Row 6 | 6 | 0 | 3 | 3 | 0 | 2 | 0 | 0 |
| Row 7 | 9 | 4 | 1 | 5 | 0 | 2 | 0 | -1 |
| Row 8 | 4 | 7 | 8 | 3 | 0 | -1 | 0 | 0 |

T'' Matrix, 2315

2401
T' Matrix

|  | Column 1 | Column 2 | Column 3 | Column 4 | Column 5 | Column 6 | Column 7 | Column 8 |
|---|---|---|---|---|---|---|---|---|
| Row 1 | 142 | 133 | 123 | 121 | 1 | 2 | 2 | -1 |
| Row 2 | 139 | 140 | 143 | 142 | 0 | 0 | 0 | 0 |

|  | Col 1 | Col 2 | Col 3 | Column 4 | Col 5 | Column 6 | Column 7 | Column 8 |
|---|---|---|---|---|---|---|---|---|
| Row 1 | $a_1''=138$ | $a_2''=132$ | 2 | 0 | 1 | 2 | 2 | -1 |
| Row 2 | -1 | -10 | 2 | 0 | 0 | 0 | 0 | 0 |
| Row 3 |  |  |  |  | 0 | 0 | 0 | 0 |
| Row 4 |  |  |  |  | 0 | 0 | -1 | 0 |
| Row 5 | 3 | -15 | -24 | -30 | 4 | 3 | 3 | 0 |
| Row 6 | 6 | 0 | -3 | -3 | 0 | 2 | 0 | 0 |
| Row 7 | 9 | 4 | 1 | 5 | 0 | 2 | 0 | -1 |
| Row 8 | 4 | 7 | 8 | 3 | 0 | -1 | 0 | 0 |

T" Matrix, 2315

*Figure 23*

2401
T' Matrix

|  | Column 1 | Column 2 | Column 3 | Column 4 | Column 5 | Column 6 | Column 7 | Column 8 |
|---|---|---|---|---|---|---|---|---|
| Row 1 | 142 | 133 | 123 | 121 | 1 | 2 | 2 | -1 |
| Row 2 | 139 | 140 | 143 | 142 | 0 | 0 | 0 | 0 |
| Row 3 | 151 | 145 | 143 | 142 | 0 | 0 | 0 | 0 |
| Row 4 | 141 | 145 | 146 | 144 | 0 | 0 | -1 | 0 |

|  | Col 1 | Col 2 | Column 3 | Column 4 | Column 5 | Column 6 | Column 7 | Column 8 |
|---|---|---|---|---|---|---|---|---|
| Row 2 | $a_3''=145$ | $a_4''=143$ | 0 | 0 | 1 | 2 | 2 | -1 |
| Row 3 | -1 | -10 | 2 | 0 | 0 | 0 | 0 | 0 |
| Row 4 | 2 | -1 | 2 | 0 | 0 | 0 | -1 | 0 |
| Row 5 | 3 | -15 | -24 | -30 | 4 | 3 | 3 | 0 |
| Row 6 | 6 | 0 | -3 | -3 | 0 | 2 | 0 | 0 |
| Row 7 | 9 | 4 | 1 | 5 | 0 | 2 | 0 | -1 |
| Row 8 | 4 | 7 | 8 | 3 | 0 | -1 | 0 | 0 |

T'' Matrix, 2315

*Figure 24*

2401, T' Matrix

| | Column 1 | Column 2 | Column 3 | Column 4 | Column 5 | Column 6 | Column 7 | Column 8 |
|---|---|---|---|---|---|---|---|---|
| Row 1 | 142 | 133 | 123 | 121 | 1 | 2 | 2 | -1 |
| Row 2 | 139 | 140 | 143 | 142 | 0 | 0 | 0 | 0 |
| Row 3 | 151 | 145 | 143 | 142 | 0 | 0 | 0 | 0 |
| Row 4 | 141 | 145 | 146 | 144 | 0 | 0 | -1 | 0 |
| Row 5 | 3 | -15 | -24 | -30 | 4 | 3 | 3 | 0 |
| Row 6 | 6 | 0 | 3 | 3 | 0 | 2 | 0 | 0 |
| Row 7 | 9 | 4 | 1 | 5 | 0 | 2 | 0 | -1 |
| Row 8 | 4 | 7 | 8 | 3 | 0 | -1 | 0 | 0 |

2603  
143~(143+142+(146+144))/4

2607  
-1~(143+142+(146+144))/4

2605  
0~(143+142+(146+144))/4

2609  
0~(143+142+(146+144))/4

| | Col 1 | Col 2 | Col 3 | Col 4 | Col 5 | Column 6 | Column 7 | Column 8 |
|---|---|---|---|---|---|---|---|---|
| Row 1 | 138 | 132 | 2 | 0 | 1 | 2 | 2 | -1 |
| Row 2 | 145 | $a_4''$=143 | 0 | $b_4''$=0 | 0 | 0 | 0 | 0 |
| Row 3 | -1 | -10 | 2 | 0 | 0 | 0 | -1 | 0 |
| Row 4 | 2 | $c_4''$=-1 | 2 | $d_4''$=0 | 0 | 3 | 3 | 0 |
| Row 5 | 3 | -15 | -24 | -30 | 4 | 3 | 3 | 0 |
| Row 6 | 6 | 0 | 3 | 3 | 0 | 2 | 0 | 0 |
| Row 7 | 9 | 4 | 1 | 5 | 0 | 2 | 0 | -1 |
| Row 8 | 4 | 7 | 8 | 3 | 0 | -1 | 0 | 0 |

T'' Matrix, 2315

*Figure 25*

|       | Column 1 | Column 2 | Column 3 | Column 4 | Column 5 | Column 6 | Column 7 | Column 8 |
|-------|----------|----------|----------|----------|----------|----------|----------|----------|
| Row 1 | 138      | 132      | 2        | 0        | 1        | 2        | 2        | -1       |
| Row 2 | 145      | 143      | 0        | 0        | 0        | 0        | 0        | 0        |
| Row 3 | -1       | -10      | 2        | 0        | 0        | 0        | 0        | 0        |
| Row 4 | 2        | -1       | 2        | 0        | 0        | 0        | -1       | 0        |
| Row 5 | 3        | -15      | -24      | -30      | 4        | 3        | 3        | 0        |
| Row 6 | 6        | 0        | 3        | 3        | 0        | 2        | 0        | 0        |
| Row 7 | 9        | 4        | 1        | 5        | 0        | 2        | 0        | -1       |
| Row 8 | 4        | 7        | 8        | 3        | 0        | -1       | 0        | 0        |

2315, T' Matrix Changes

2401 T' Matrix

*Figure 27*

2915 "a" portion of T'' Matrix 2315

| | Column 1 | Column 2 | Column 3 | Column 4 | Column 5 | Column 6 | Column 7 | Column 8 |
|---|---|---|---|---|---|---|---|---|
| Row 1 | 138 | 132 | 2 | 0 | 1 | 2 | 2 | -1 |
| Row 2 | 145 | 143 | 0 | 0 | 0 | 0 | 0 | 0 |
| Row 3 | -1 | -10 | 2 | 0 | 0 | 0 | -1 | 0 |
| Row 4 | 2 | -1 | 2 | -30 | 0 | 0 | 3 | 0 |
| Row 5 | 3 | -15 | -24 | 3 | 4 | 3 | 3 | 0 |
| Row 6 | 6 | 0 | 3 | 5 | 0 | 2 | 0 | 0 |
| Row 7 | 9 | 4 | 1 | 5 | 0 | 2 | 0 | -1 |
| Row 8 | 4 | 7 | 8 | 3 | 0 | -1 | 0 | 0 |

$4 \sim (138-132+(145+143))/4$
$139 \sim (138-132+145+143))/4$  2907
$2 \sim (138-132-(145-143))/4$  2909
$1 \sim (138-132-(145-143))/4$  2911

2905

T''' Matrix 2913

| | Col 1 | Col 2 | Col 3 | Column 4 | Column 5 | Column 6 | Column 7 | Column 8 |
|---|---|---|---|---|---|---|---|---|
| Row 1 | $a_1'''=139$ | $b_1'''=2$ | 2 | 0 | 1 | 2 | 2 | -1 |
| Row 2 | $c_1'''=4$ | $d_1'''=1$ | 0 | 0 | 0 | 0 | 0 | 0 |
| Row 3 | -1 | -10 | 2 | 0 | 0 | 0 | -1 | 0 |
| Row 4 | 2 | -1 | 2 | -30 | 0 | 0 | 3 | 0 |
| Row 5 | 3 | -15 | -24 | 3 | 4 | 3 | 3 | 0 |
| Row 6 | 6 | 0 | 3 | 5 | 0 | 2 | 0 | 0 |
| Row 7 | 9 | 4 | 1 | 5 | 0 | 2 | 0 | -1 |
| Row 8 | 4 | 7 | 8 | 3 | 0 | -1 | 0 | 0 |

*Figure 28*

|        | Col 1 | Column 2 | Column 3 | Column 4 | Column 5 | Column 6 | Column 7 | Column 8 |
|--------|-------|----------|----------|----------|----------|----------|----------|----------|
| Row 1  | 139   | 2        | 2        | 0        | 1        | 2        | 2        | -1       |
| Row 2  | -4    | 1        | 0        | 0        | 0        | 0        | 0        | 0        |
| Row 3  | -1    | -10      | 2        | 0        | 0        | 0        | 0        | 0        |
| Row 4  | 2     | -1       | 2        | 0        | 0        | 0        | -1       | 0        |
| Row 5  | 3     | -15      | -24      | -30      | 4        | 3        | 3        | 0        |
| Row 6  | 6     | 0        | 3        | 3        | 0        | 2        | 0        | 0        |
| Row 7  | 9     | 4        | 1        | 5        | 0        | 2        | 0        | -1       |
| Row 8  | 4     | 7        | 8        | 3        | 0        | -1       | 0        | 0        |

3103, average of entire matrix

3101, Data matrix after final tranformation

*Figure 30*

| | Col 1 | Col 2 | Column 3 | Column 4 | Column 5 | Column 6 | Column 7 | Column 8 |
|---|---|---|---|---|---|---|---|---|
| Row 1 | a''' | b''' | b'' matrix | | | b' matrix 3007 | | |
| Row 2 | c''' | d''' | | | | | | |
| Row 3 | c'' matrix | | d'' matrix | | | | | |
| Row 4 | | | | | | | | |
| Row 5 | c' matrix 3003 | | | | | d' matrix 3005 | | |
| Row 6 | | | | | | | | |
| Row 7 | | | | | | | | |
| Row 8 | | | | | | | | |

Data after the Last Stage Transform

*Figure 32*

SYSTEM AND METHOD OF VIDEO FRAME MEMORY REDUCTION OF VIDEO DECODERS

FIELD OF THE INVENTION

This invention relates generally to the expansion of compressed video. More specifically, embodiments of this invention relate to an apparatus, system, and method for reducing the video frame memory required for a compressed video decoder.

DESCRIPTION OF THE RELATED ART

Embodiments of the present invention also relate generally to an apparatus, system, and method for processing Motion Picture Experts Group ("MPEG") data in a video decoder. The Motion Picture Experts Group is a committee of experts that was formed under the auspices of the International Organization for Standardization, or ISO, in 1988. The MPEG is an engineering working group that generate the standards for the digital compression of video and audio signals. The MPEG group has fostered several standards, e.g., MPEG 1, MPEG 2, MPEG 4 and MPEG 7, that have become recognized as international standards for digital compression of video and audio signals. The MPEG standards have been implemented within the high definition TV ("HDTV") standard, that has begun broadcasting in the United States.

However, the conventional and currently prevailing system of television broadcasts in the United States is the National Television Standards Committee ("NTSC") system. The NTSC system is an analog system that has been used for over 50 years, and specifies the protocol of video signals that are broadcast over the air to television receivers. The NTSC standard encompasses and defines various aspects of an analog video signal, including the bandwidth and frequency restrictions, as well as the signal levels utilized in standard definition television ("SDTV") receivers.

In the early days of television, television receivers were relatively expensive. The cost of providing programming was also relatively expensive. As electronics progressed, early vacuum tubes were replaced by more capable and more dependable vacuum tubes. Then, transistors gradually replaced the vacuum tubes. As electronics progressed even further, the single transistor was replaced by an integrated circuit in which many transistors could be contained on one circuit. As a consequence, the cost of producing television receivers declined in relative terms. Thus, more and more television receivers became available until the present day, where the average family has more than one television receiver per household.

Along with the reduction in the cost of television receivers, the cost of producing programming for television receivers has also been reduced. For example, video cameras can now be held in one hand, and they can be purchased relatively inexpensively. Also, there is a great deal of programming available. Consequently, various techniques to facilitate all of this additional programming have been sought.

One of these techniques involves utilizing digital television. Digital television systems replace the traditional NTSC analog signals with a signal comprising digital bits of data. Video and audio signals that were heretofore only available as analog signals can be now encoded digitally and broadcast. Digital broadcasting is utilized to improve quality, and to increase the capacity of existing channels.

However, the digital encoding of television signals, by itself, does not conserve television bandwidth. For example, if a conventional SDTV analog signal is instead encoded digitally, the amount of frequency spectrum required to broadcast the resulting digital signal will ordinarily be in excess of a 6 Megahertz ("Mhz") bandwidth. This excess bandwidth size is a problem, because the 6 Mhz bandwidth limitation is required by the conventional NTSC analog SDTV signal. However, an advantage of digital signals is that sophisticated compression techniques can be utilized, that were not conventionally amenable to analog signals. Thus, a digital signal may be compressed so as to fit within the preferred 6 Mhz bandwidth.

Further, video signals often contain a great deal of redundant information. By encoding, or compressing, the video information so that the redundant information is eliminated prior to transmission, a great deal of bandwidth can be saved. Also, various compression techniques can be used to compress a digital video signal to a fraction of its original size.

Specifically, each frame of a digital picture is composed of pixels. The pixels derive their name from the fact that they are picture elements. Repeated pixels are one source of redundancy that can be removed by digital compression techniques.

For example, in a video picture, a blue sky scene may occupy a large part of the frame. The blue sky may contain a single pixel that is repeated hundreds or thousands of times. However, instead of broadcasting each pixel, a run-length coding ("RLC") technique can be employed. Run-length coding has many different implementations. However, each of these implementations basically replace a string of "like" pixels with a single pixel, and then indicates or stores some sort of counter, or number, that indicates how many times the same pixel is repeated.

In addition to run-length coding, a variable-length coding ("VLC") technique can be employed. For example, a Huffman coding is one way of realizing a variable-length coding. Variable-length coding thus encodes the pixels that are more prevalent within a scene with a smaller number of bits, as compared to the relative number of bits utilized for pixels that are less prevalent in the scene.

Once again, using the illustration of a video picture with a blue sky scene portion, conventionally, the blue sky is represented by a 16 bit sized bit pattern. However, by utilizing the variable-length coder technique, only an 8 bit sized bit pattern is required for the blue sky scene portion. Thus, a 50% coding length savings may be achieved on this portion of the scene.

By utilizing these compression techniques, it is possible to fit more than one channel onto a single 6 Mhz bandwidth. But, as more and more programming becomes available, it becomes more and more difficult to fit this larger amount of programming into the existing 6 Mhz bandwidths. In other words, it is difficult to increase the number of channels that are carried on a single bandwidth available without increasing the amount of bandwidth used.

Digital TV is being utilized to increase both the amount of programming available and the quality of the picture available without increasing the bandwidth requirements. However, there is a tradeoff between the computing resources that are required to generate digital pictures, and the computing resources that are required to compress and decompress such pictures. These tradeoffs are based, in part, upon the relative costs of implementation of the various conventional techniques.

Specifically, in many video compression techniques, the frame memories are used to save the previously coded frame(s) that are used in compressing the new frames. In the decompression stage at the receiver, the frame memories are also used for the decoding process. But as to the cost, while the price of frame memories continues to decrease, frame memories still constitute a large portion of the cost of both encoders and decoders. It is, therefore, beneficial to reduce the required amount of frame memory, especially for video decoders.

For example, for an HDTV video decoder, one frame memory comprises a size of about 3.1 MB. This corresponds to a frame size of 1920 pixels by 1080 lines of luminance and ½ of that for the two other color components. Also, each video decoder requires at least 2 frame memories for the decoding of video.

Conventional solutions have attempted to reduce the frame memory requirements for video decoders by a factor of two or more. However, these memory compression solutions are merely an extension of compression algorithms that are used for the storage of transmission of data, with some additional constraints. The following three constraints are considered important.

The first constraint relates to the timing issues in performing the compression of the frame, storing the frame into the frame memory, and then decompressing a portion of the frame within the required time interval for decompressing one frame of video. The second constraint is providing the ability to access arbitrary portions of the compressed frame for decoding. The third constraint is to guarantee that the designated memory storage is sufficient for the compressed frame.

The conventional solutions to this frame memory problem incorporate a rate controller to ensure that the compressed video will fit into the desired memory area. However, this rate controller solution requires a tradeoff between the accessibility of the data and the compression factor. However, the rate controller solution cannot guarantee that the compressed data will fit into the designated memory area. Furthermore, the rate controller increases the computational requirements.

Thus, what is needed is an improved apparatus, system, and method for reducing the video frame memory required for a compressed video decoder.

SUMMARY OF THE EMBODIMENTS

Embodiments of the present invention are best understood by examining the detailed description and the appended claims with reference to the drawings. However, a brief summary of embodiments of the present invention follows.

Briefly described, an embodiment of the present invention comprises a device and a method that provides for the improvement of a reduction in a video frame memory requirement with respect to a compressed video decoder.

In one embodiment, this improvement is achieved by a removal of the rate controller. Also, both a block compression technique and a fixed storage allocation technique are utilized, in order to lower the overall system cost, and to lower the frame memory requirements.

In a preferred embodiment, this improvement is achieved by performing a hierarchical transform, e.g., a Haar transform, that operates on the previously decoded frames. Then, the coefficients obtained from this transformation are quantized and then run-length coded, utilizing variable-length codes. The hierarchical transform preferably operates on an N×N block size with L levels of hierarchical decomposition, where N and L can be selected in advance. For example, in one preferred embodiment, N may equal 8, and L may equal 3.

The compression system then fits the N×N block into an allocated storage of (N×N)/cf bytes, where cf designates the compression factor. For example, a nominal value of cf that equals 2, 3, or 4 may be utilized. The quantization process comprises a simple scaling of the coefficients. However, the DC coefficient is not scaled. The variable-length encoder comprises a run-length encoder that fits as many coefficients as is possible into the available space of the (N×N)/cf bytes.

These and other advantages and novel features that characterize the invention are particularly pointed out in the included claims. For additional understanding and clarification of the invention, and of its advantages and variations, reference should be made to the accompanying drawings, descriptive matter, and claims that illustrate and describe specific examples of embodiments of the invention.

BRIEF DESCRIPTIONS OF THE DRAWINGS

Embodiments of the present invention are described in detail herein with reference to the accompanying drawings, in which like reference numbers represent corresponding parts in all the drawings, and in which:

FIG. 7C is an exemplary graphic illustration of an MPEG macroblock, the "T" transform equations and the "T" Matrix that results from the application of "T" transform equations to the MPEG macroblock.

FIG. 7D is an exemplary graphic illustration of the application of the "T" transform to the "A" section of the "T" Matrix.

FIG. 7E is an exemplary graphic illustration of the application of the "T" transform.

FIG. 11 is an exemplary graphical illustration of a search for a desired block of picture data in a conventional system as compared with a search for a desired block of picture data in a preferred embodiment of the invention.

FIG. 11A is an exemplary graphical illustration of a search for a desired block of picture data in a conventional system.

FIG. 11B is an exemplary graphical illustration of a search for a desired block of picture data in a preferred embodiment of the invention.

FIG. 13 is an exemplary table of a binary number (11111111) being successively divided by 2 in a hardware divide by 2.

FIG. 15 is an exemplary graphical representation of an illustrative computation of the first coefficient in each of the four sectors of the "T" Matrix.

FIG. 16 is a graphical illustration of an exemplary computation of the $1^{st}$ through $4^{th}$ coefficients in the A section of the "T'" Matrix, from rows 1 and 2 of the example macroblock.

FIG. 17 is a graphical illustration of an exemplary computation of the $5^{th}$ through $8^{th}$ coefficients in the A section of the T' Matrix, from rows 3 and 4 of the example macroblock.

FIG. 18 is a graphical illustration of an exemplary computation of the $9^{th}$ through $12^{th}$ coefficients in the A section of the T' Matrix, from rows 5 and 6 of the example macroblock.

FIG. 19 is a graphical illustration of an exemplary computation of the $13^{th}$ through $16^{th}$ coefficients in the A section of the T' Matrix, from the rows 7 and 8 of the example macroblock.

FIG. 22 is a graphical illustration of an exemplary computation of the first a, b, c and d coefficients of the T" Matrix from the coefficients of the "a" section of the T' Matrix.

FIG. 23 is an exemplary graphical illustration of the $1^{th}$ and $2^{nd}$ section coefficients of the T" Matrix being generated from the coefficients within the "a" section of the T' matrix.

FIG. 24 is an exemplary graphical illustration of the $2^{nd}$ and $3^{rd}$ "a'" section of the T' Matrix that are generated from the coefficients within a section of the T' Matrix.

FIG. 25 is a graphical illustration of an exemplary computation of the last a, b, c and d coefficients of the T" Matrix that are calculated from the coefficient of a section of the T' Matrix.

FIG. 27 is a coefficient table of an exemplary resultant matrix after two iterations of the "T" transform.

FIG. 28 is a graphical illustration of an exemplary computation of the T'" Matrix from a section of the T" Matrix.

FIG. 30 is a table illustrating an exemplary resulting matrix after three iterations of the "T" transform.

FIG. 32 is an exemplary illustration of exemplary data after a last stage "T'" transform.

Figure 1:
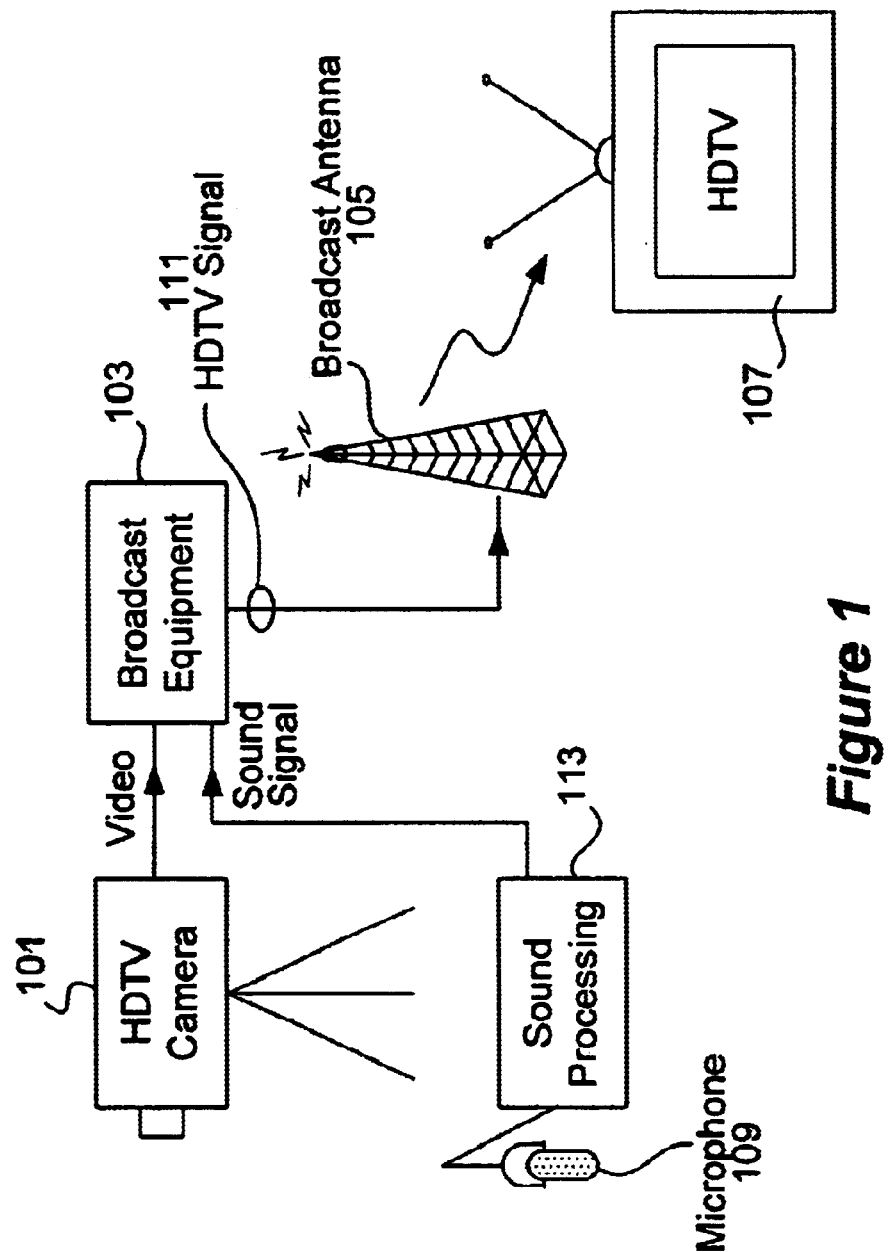
FIG. 1 is a graphical example of an illustrative environment in which aspects of the invention may be found.

The accompanying drawings, wherein like numerals denote like elements, are incorporated into and constitute a part of the specification, and illustrate presently preferred exemplary embodiments of the invention. However, it is understood that the drawings are for purpose of illustration only, and are not intended as a definition of the limits of the invention. Thus, the drawings, together with the general description given above, and the detailed description of the preferred embodiments given below, together with the appended claims, serve to explain the principles of the invention.

DETAILED DESCRIPTION

The accompanying drawings refer to and illustrate descriptions of exemplary embodiments of the present invention. It is to be understood that other embodiments may be practiced, and structural changes and/or implementation variations may be made and utilized without departing from the scope and spirit of the invention described herein.

Embodiments of the present invention may be adapted so as to be utilized in cooperation with embodiments described in U.S. patent application Ser. No. 09/409,823 filed on Sep. 30, 1999 by applicants Faramarz Azadegan and Krisda Lengwehasatit that is entitled "A DCT DOMAIN CONVERSION OF A HIGHER DEFINITION SIGNAL TO A LOWER DEFINITION SIGNAL," and that is incorporated by reference as though fully set forth herein. It is understood that embodiments of the present invention that may be utilized with embodiments of the U.S. patent application Ser. No. 09/409,823 comprise only some of the many embodiments that may be practiced in utilizing the present invention. In other words, the present invention may be utilized with a wide variety of systems, of which the embodied systems of application Ser. No. 09/409,823 comprise only a relatively small and relatively specific group of systems as compared to the applicability of the present invention in its many embodiments.

The following detailed description first describes an overview of an embodiment of the present invention. Next, with reference to FIGS. 1–6, a detailed discussion of an overview of an MPEG-2 signal technique that may be utilized with some of the various embodiments of the present invention is described. Then, with reference to FIGS. 7–32, a more detailed description of various embodiments are illustrated and, e.g., specific exemplary embodiments of a "T" transform are described. However, it will be understood by one skilled in the art that any of these embodiments, as described herein, are merely exemplary and that the present invention is broad in scope so as to not be limited to the specific detailed exemplary embodiments as described herein. Further, it will be understood by one skilled in the art that, e.g., various components of the present invention, as illustrated in FIGS. 1–32, are not shown in order to simplify the illustrations.

It will also be understood by one skilled in the art that the transmitted signal comprising the exemplary data stream, e.g., an MPEG data stream, need not be received through the air. Instead, the signal may be transmitted or received in any manner, including over cable or telephone lines, from spacecraft, and by any other system, method or device.

Embodiments of the invention comprise a new device and method to realize an improved video frame memory reduction for a video decoder. In one embodiment, this improvement is achieved by a removal of the rate controller and the utilization of both a block compression technique and a fixed storage allocation technique, in order to lower the overall system cost, and to lower the frame memory requirements.

In a preferred embodiment, this improvement is achieved by performing a hierarchical transform, e.g., a Haar transform, that operates on the previously decoded frames. Then, the coefficients obtained from this transformation are quantized and then run-length coded, utilizing variable-length codes. The hierarchical transform preferably operates on an N×N block size with L levels of hierarchical decomposition, where N and L can be selected in advance. For example, in one preferred embodiment, N may equal 8, and L may equal 3.

The compression system then fits the N×N block into an allocated storage of (N×N)/cf bytes, where cf designates the compression factor. For example, a nominal value of cf that equals 2, 3, or 4 may be utilized. The quantization process comprises a simple scaling of the coefficients. However, the DC coefficient is not scaled. The variable-length encoder comprises a run-length encoder that fits as many coefficients as is possible into the available space of the (N×N)/cf bytes.

In other alternate embodiments, the present invention may be utilized as a portion of an algorithm that reduces the video frame memory requirement for a video decoder. Also, embodiments of the present invention may be utilized with a DSP, or may be implemented either partially or wholly in electrical circuitry.

Now, with reference to FIGS. 1–6, a more detailed description of an exemplary MPEG-2 signal is described, that is utilized in accordance with the principles of an embodiment of the present invention.

FIG. 1 illustrates an exemplary environment in which aspects of the invention may be found. In FIG. 1, a high definition television camera 101 produces a video signal that is coupled into the broadcast equipment 103. Also, a microphone 109 couples sound via a sound signal into the sound processing system 113. The sound signal is also coupled into the broadcasting equipment 103. The broadcast equipment digitizes and compresses the sound and video signal, thus producing an encoded HDTV signal 111.

The HDTV signal 111 is then coupled into the broadcast antenna 105. The HDTV signal 111, comprising MPEG-2 packets, is then broadcast through the air and finds its way to a high definition television, or HDTV 107, where it is displayed.

Figure 2:
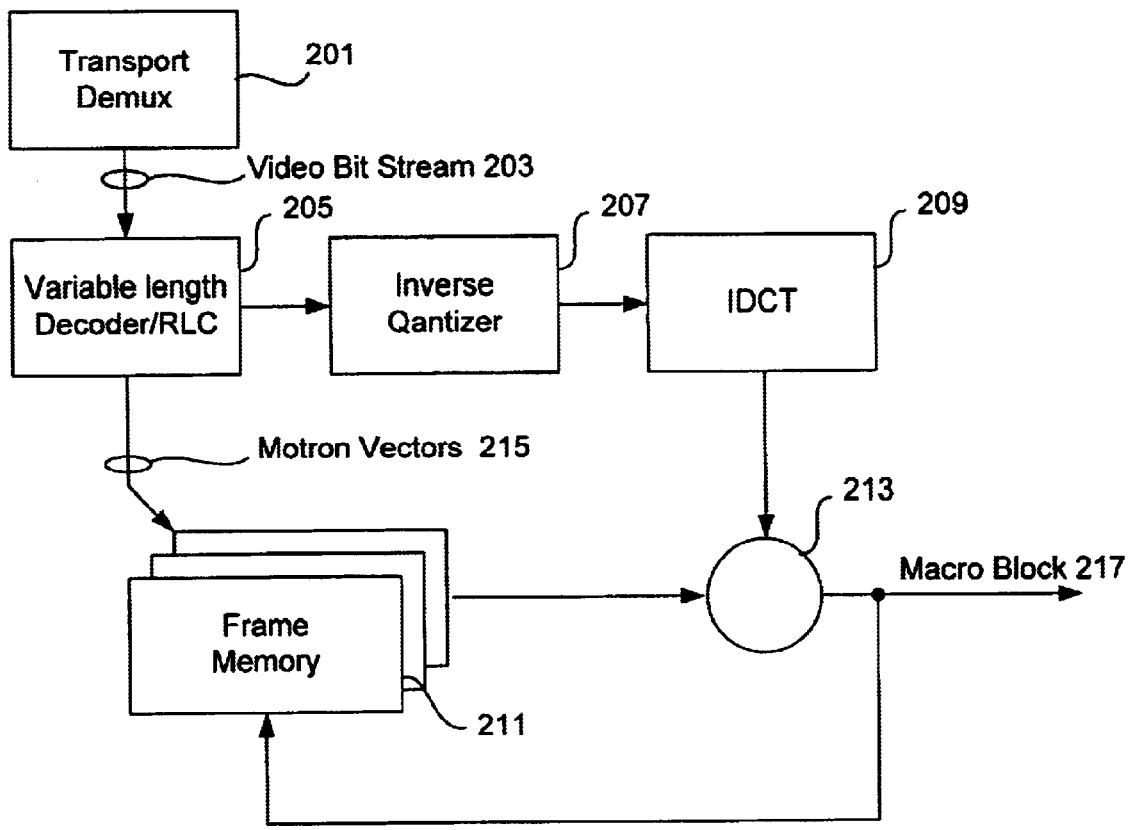
FIG. 2 is a block diagram of a video decoder illustrating the basis of MPEG-2 video decompression.

FIG. 2 is a video decoder block diagram illustrating the basics of an MPEG-2 video decompression. The transport demultiplexer, or DMUX 201, receives the MPEG-2 packets that contain the encoded video and audio information in HDTV signal 111. The transport DMUX 201 then produces a video bitstream 203 from the MPEG-2 packets.

The video bitstream 203 is then coupled into a variable-length decoder/run-length decoder ("VLD/RLD") 205. The variable-length decoder/run-length decoder 205 restores the original bitstream, replacing the run-length encoding and variable-length encoding by a stream of bits representing discrete cosine transform ("DCT") coefficients, motion vector values, and other book-keeping information. This bitstream is next coupled into an inverse quantizer 207.

It is understood that a variable-length decoder/run-length decoder, or VLD/RLD, preferably comprises just a portion of a run-length coder/variable-length coder, or RLC/VLC technique, wherein "coder" comprises either an encoder, or decoder, or both. Also, an "encoder" preferably comprises a coding or encoding of the signal, and a "decoder" preferably comprises a decoding of the signal after it has been encoded.

It should be noted that when the video is originally sampled, it is also preferably quantized. In other words, different digital levels are assigned to different video levels. A quantizer may be a uniform scaler type quantizer. This corresponds to a staircase of equal spacing of steps, so that a continuum of input values is divided into a number of increments of equal size. In this case, the amount that any step can differ from the actual value is ½ of a step.

Also, quantizers may be non-uniform. Quantizers may be used to encode data so that the values that are more prevalent in a picture, or scene, may have smaller steps assigned to them. In this manner, the amount of error can be reduced for the more prevalent values within a picture.

Further, the quantization may change between scenes or between different MPEG-2 signals. Thus, this quantization must be removed, in order for the decompression hardware and algorithms to operate on a uniform bitstream.

After the coefficients are inversely quantized, they are coupled into an inverse discrete cosine transform ("IDCT") device 209. The IDCT device 209 produces the coefficients for the DCT blocks.

In addition to these coefficients that are decoded, the motion vectors 215 are also decoded, as illustrated in FIG. 2. Motion vectors 215 correspond to a previous area in the frame. The specific area in the frame is picked up from previously decoded frames. The motion vectors 215 are then added to the coefficients from the IDCT 209 in adder 213 to produce a macroblock 217 signal. The macroblock represents a part of a moving image and can be inserted back into frame memory, if it is needed.

Figure 3:
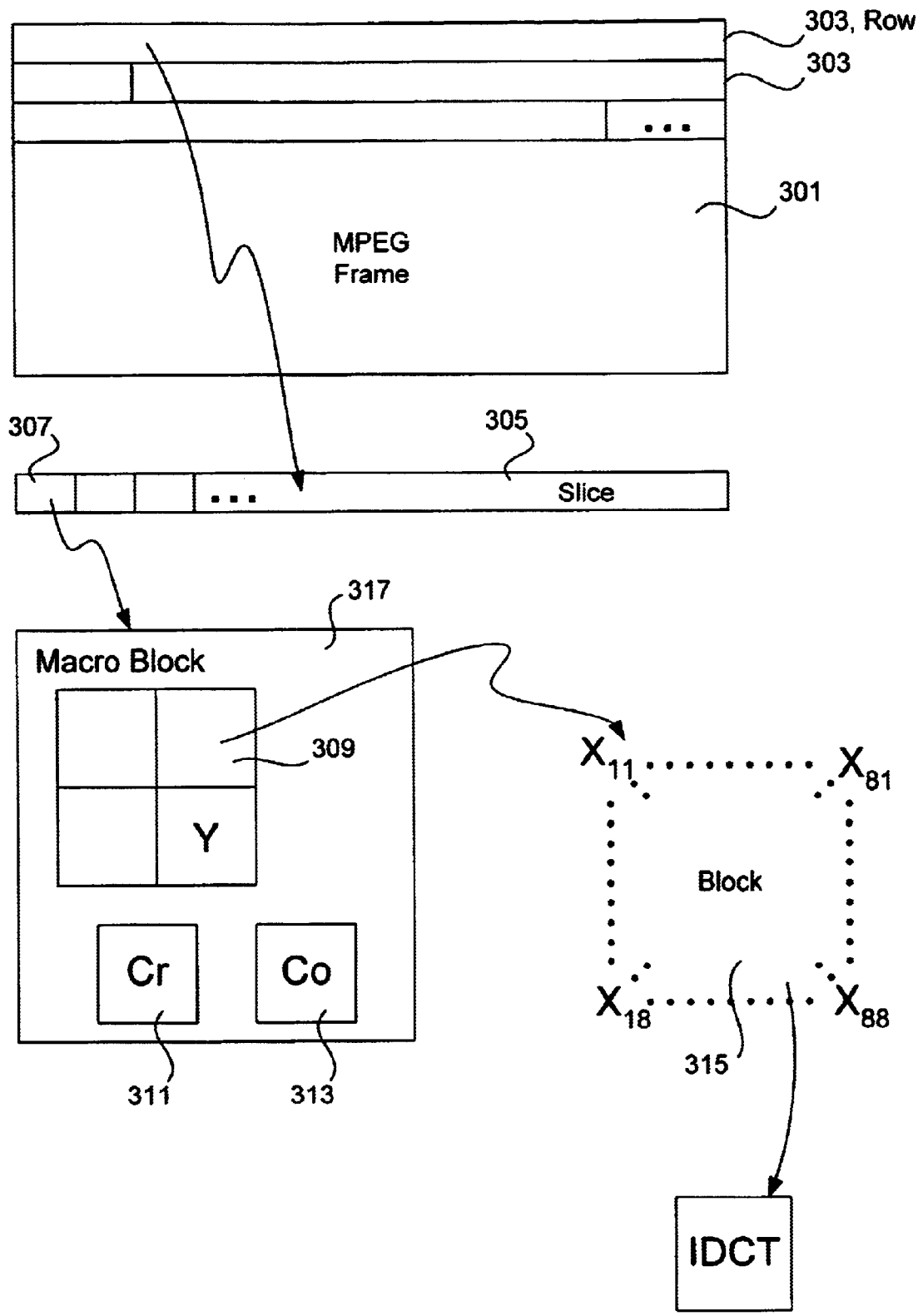
FIG. 3 is a simplified illustration of the format of MPEG-2 video compression.

FIG. 3 is a simplified illustration of the format of an MPEG-2 video compression. An exemplary MPEG-2 video frame 301 is illustrated in FIG. 3. The MPEG-2 video frame 301 is equivalent to two vertical field scans of a television receiver. Each vertical scan of television comprises one field, and the combination of two consecutive fields comprises a frame.

Within the MPEG-2 frame 301 there are rows of macroblocks 303. Each row of macroblocks 303 contains 16 lines of video. The rows of macroblocks 303 are further divided into slices 305. A slice 305 is a sequence of macroblocks that start and end at the same row. Slice 305 illustrates a slice of MPEG-2 data that is comprised of macroblocks, such as the first macroblock 307.

Each macroblock has a particular format 317. A macroblock contains three distinct sections. The first section is a luminance matrix 309. It comprises a 16×16 matrix of luminance coefficients corresponding to four blocks. Also, within the macroblock there are 2 blocks containing color components. Each block is comprised of 8 pixels in the horizontal direction and 8 lines in the vertical directions, and is generally referred to as an 8×8 block. A DCT operation is conducted on these 8×8 blocks.

As to the color components, for example, the Cr matrix 311 contains color components for the red contribution to the macroblock, and the Cb matrix 313 has components that correspond to the blue contribution of the macroblock. The Y matrix 309 contains four 8×8 blocks of information, each of which is similar to the generic matrix block 315. These blocks of data, i.e., both the Y blocks 309, and the chroma blocks 311, 313, are in the form of DCT blocks. The coefficients in each block must go through an IDCT.

Figure 4:
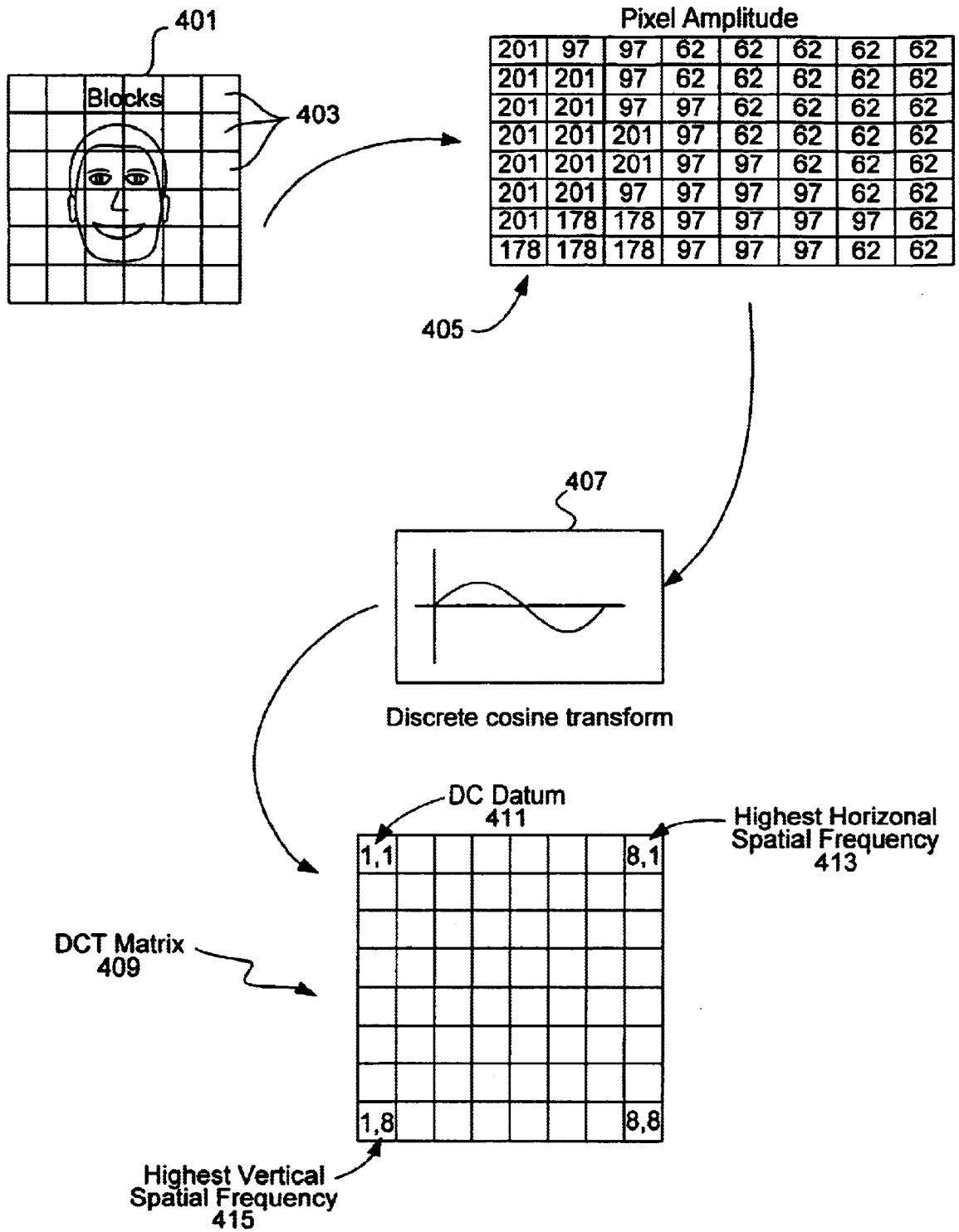
FIG. 4 is a simplified illustration of a DCT function.

FIG. 4 is a simplified illustration of a DCT function. The video picture 401 comprises one luminance and two chrominance components, or frames 401, that are divided into blocks 403. Each of the blocks 403 is an 8×8 matrix of pixel values. The pixel values represent the amplitude of the signal, e.g., the luminance/chrominance portion of the signal. Each of the coefficients within the 8×8 matrix represents a value of the pixel amplitude at a corresponding position in one of the blocks 403. An exemplary value 405 of magnitude 178 is illustrated in FIG. 4. The pixel amplitude matrix is then processed through a DCT function 407. The DCT function 407 converts the pixel matrix into a DCT matrix. The DCT matrix is also an 8×8 matrix.

However, instead of merely comprising pixel amplitudes, the elements of the DCT matrix comprise frequency components. FIG. 4 illustrates an exemplary DCT matrix 409. Within the 8×8 DCT matrix 409, the top left position within the matrix, i.e., the "1" or "first" position, is the DCT datum 411. This DCT datum 411 represents the average value of all the pixels in the block.

For example, at the far right of the first row, in the "8,1" position in the DCT matrix 409, resides the coefficient that represents the highest horizontal spatial frequency 413 contained within the block, and how much of that frequency is present. Likewise, the "1,8" position of the DCT matrix 409 represents the highest vertical spatial frequency 415 within the block.

Figure 5A:
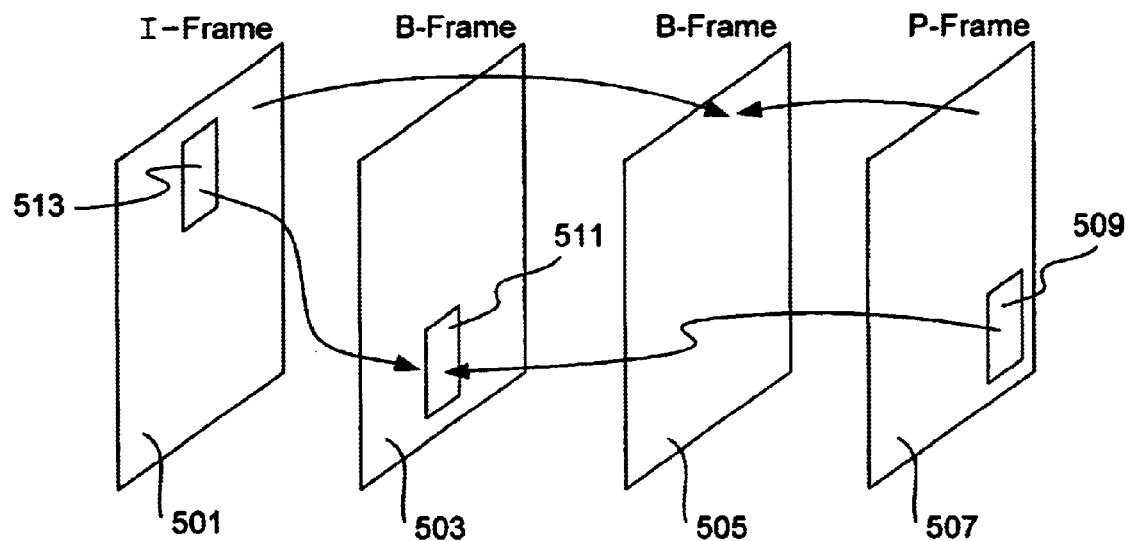
FIG. 5A illustrates a re-assembly technique of a video picture frame from an MPEG-2 I frame and P frame.

FIG. 5A illustrates the reassembly of a video picture frame from the MPEG-2 frames. There are three types of MPEG-2 frames. These three frame types are called the I frame, the B frame, and the P frame.

An intra, or Index, or "I" frame 501 is shown in FIG. 5A. The I frame 501 is the MPEG-2 data that contains the full information regarding the picture. The I frame 501 is referred to as an index frame because it is the starting point from which other frames are constructed.

Conventionally, the I frames are transmitted approximately once every, e.g., twelve or fifteen frames. The I frames are the least compressed frames, and they comprise the starting frames when the process of reconstructing the video frames has an unrecoverable error, and comprise the starting frames in a new channel acquisition.

Two exemplary B frames 503, 505 are also shown in FIG. 5A. The B frames are also known as bidirectional predicted frames. These B frames 503, 505 have the most compression and they are constructed from past and future frames.

Figure 5B:
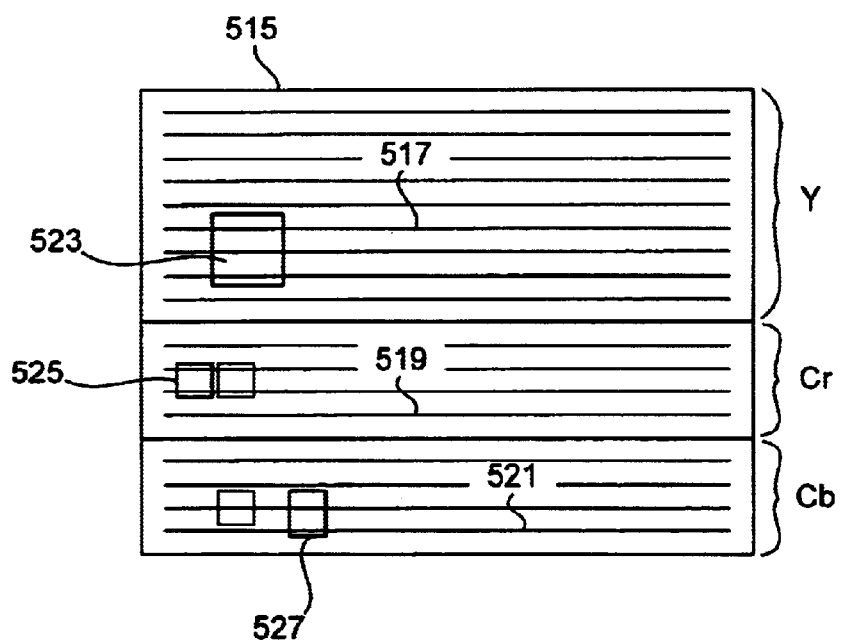
FIG. 5B illustrates an exemplary frame of a video that may be stored in a video frame memory.

An example of a P frame 507 is also shown in FIG. 5B. The P frames are predicted frames, that are predicted from either past I frames or past P frames.

For example, in FIG. 5A, the macroblock is in a first position 513 in the I frame 501. Within the next B frame 503, the macroblock may move into a second position 511. Also, the macroblock may be predicted from a future P frame. For example, the P frame 507 may have the same macroblock in a third position 509, and that macroblock will be projected into the B frame at the second position 511. In this way, the frames are constructed from past and future frames. This construction is performed in order to provide a more efficient throughput, because there is often a high redundancy in picture information between frames.

Frames generally differ very little between each consecutive frame. For example, an NTSC type picture comprises 60 fields, i.e., 30 frames, per one second of video. Although a viewer may perceive motion on the television screen, it is due in large part to the persistence of the eye in perceiving minute changes between frames. This perception can be realized graphically within a VCR slow motion mode. If a VCR video is stepped one frame at a time in slow motion mode, the minor differences between successive frames can be seen, as well as the portions of the scene that may stay relatively unchanged between two frames.

FIG. 5B illustrates an MPEG-2 frame. For the sake of illustration, it will be assumed that it is an I frame, but the comments can also apply to a B frame or a P frame. The storage of data within these exemplary frames is defined by the MPEG-2 ISO specification. However, when frames are received and stored in a video decoder, they may be stored in any type of format, depending upon what is convenient for the application in question.

For example, a common method of storing video information from MPEG-2 frames is illustrated in FIG. 5B. FIG. 5B shows one complete video frame 515. The video frame 515 is divided into three discrete portions or sections 517, 519, 521. The first section 517 represents the Y or luminance component of the picture. The second section 519 represents the chrominance portion of the picture representing the color red. The third section 521 of the video frame 515 is also the chrominance information. However, the third section 521 is representing the color blue.

Video is generally defined as having color and luminance components. The color components represent different colors. For example, red, green, and blue are often used as components within a picture tube. The Y component is the luminance component, that is often referred to as the brightness component. Of course, it is only necessary to know three of these four components, because by knowing three of the four, the remaining one can be derived.

For example, if the R component, i.e., the red component, the G component, i.e., the green component, and the B component, i.e., the blue component, of the video are known, then the picture may be reconstructed. Here, the fourth component, i.e., the luminance or brightness portion of the picture, is reconstructed. Likewise, if for a first and second component, only the red and blue components are known, and for a third component the luminance or brightness portion of the picture is known, then the green component of the picture can be reconstructed as the fourth component.

In FIG. 5B, within frame 515 is a group of coefficients 523 that represent the macroblock in position 513. The corresponding Cr component 525 represents the red chroma information. The corresponding Cb component 527 within the frame 515 represents the blue information.

As can be seen from FIG. 5B, the position of these coefficients within the frame 515 is somewhat random. The chrominance portion 523 may be displaced within the block by a certain amount. Also, the color components 525, 527 can be displaced within the block by a similar amount, but this displacement is not proportional to the chrominance portion 523 displacement. This displacement occurs because the amount of compression can vary throughout the frame. Because the exact displacement of the macroblock 513 data within the frame 515 is not known, it may be necessary to examine each point within the frame until the necessary data for the macroblock 513 is encountered.

This variable compression also can lead to another problem. This problem is that the actual amount of storage needed to represent the frame may not be constant. This can lead to uncertainty in searching for a particular DCT macroblock within the frame, for example, in order to reconstruct a B frame. Therefore, in any MPEG-2 datastream, the first frame will be an I frame, which may be then followed by several B frames, and then a P frame.

As to the B frames, they are predicted from an I frame preceding/following it and a P frame following/preceding it. Alternatively, a B frame may be predicted from a P frame preceding the B frame and a P frame following the B frame.

This gives rise to the requirement that at least two frames must be able to be stored in memory, e.g., two MPEG-2 frames, in order to reconstruct any other MPEG-2 frame. This is required because of the way that the MPEG-2 frames are constructed. This construction is further described as follows for three types of frames.

Specifically, the first frame type, i.e., the I frame, does not refer to any other frame. Therefore, an I frame needs no other frame in memory to reference it. In theory, if all the MPEG-2 frames were I frames, then there would be no need for a video frame memory. In practice, of course, there are P frames and B frames within the MPEG-2 stream, and these frames comprise a second and third type of frame.

For example, a P frame is predicted from an I or a P frame. Therefore, a P frame must have an I or P frame within the video frame memory. Thus, if the MPEG-2 data consisted only of I frames and P frames, all that would be necessary is a video frame memory to store the I or a P frame. Also, then any P frame could be constructed from it.

The B frame is the third frame within the MPEG-2 datastream. The B frame may be predicted from a previous frame, an I frame or P frame, or from a following P frame. Therefore, to construct B frames, it is necessary to have the capability of storing two video frames in memory, i.e., a previous frame and a future frame. Thus, MPEG-2 decoders must be able to store at least two video frames.

The two frame memories are required to contain one full video frame each, i.e., to contain the full uncompressed video frame.

Each of the video frame memories are sized, so that they each may contain an entire uncompressed video frame. This sizing is to assure that there is enough video frame memory to decode any MPEG-2 frames.

However, video frame memory comprises high speed memory. And even with the declining prices of this memory, this large amount of high speed memory can be very expensive. Therefore, it is a goal of many MPEG-2 video decoder designers to use as little of this high speed video frame memory as possible.

In order to reduce the cost of frame memory, one design tact that may be taken is to compress the MPEG-2 frames themselves, that are being fit into the frame memory. By merely compressing the two frames, there can be a saving of video frame memory. Also, compressing the video within the video frame memory can save high speed video memory, but this video compression can also lead to several difficulties.

The first difficulty is that there is no definitive length for the compressed video frames, or the video frame memories, because it cannot be known, a priori, just how much any given frame will compress. The second problem arises when the compressed video within the video frame memories is attempted to be used. Because the video is compressed, a certain macroblock cannot be predicted to be present within the frame at any particular offset or storage location.

The offset of the macroblock within the frame depends upon the amount of compression of the frame. For example, if a frame is mainly random noise, very little compression is possible, and any macroblock will be at a relatively far displacement into the video frame. However, if the scene is a scene into which a large amount of compression may be applied, this same macroblock may be located near the head, or front, of the video frame memory.

In addition, the encoding and decoding process must be simple enough so that it can be accomplished quickly, e.g., on the fly. This process must not be so complex so as to preclude the decoding of an MPEG-2 signal in real time.

Figure 6:
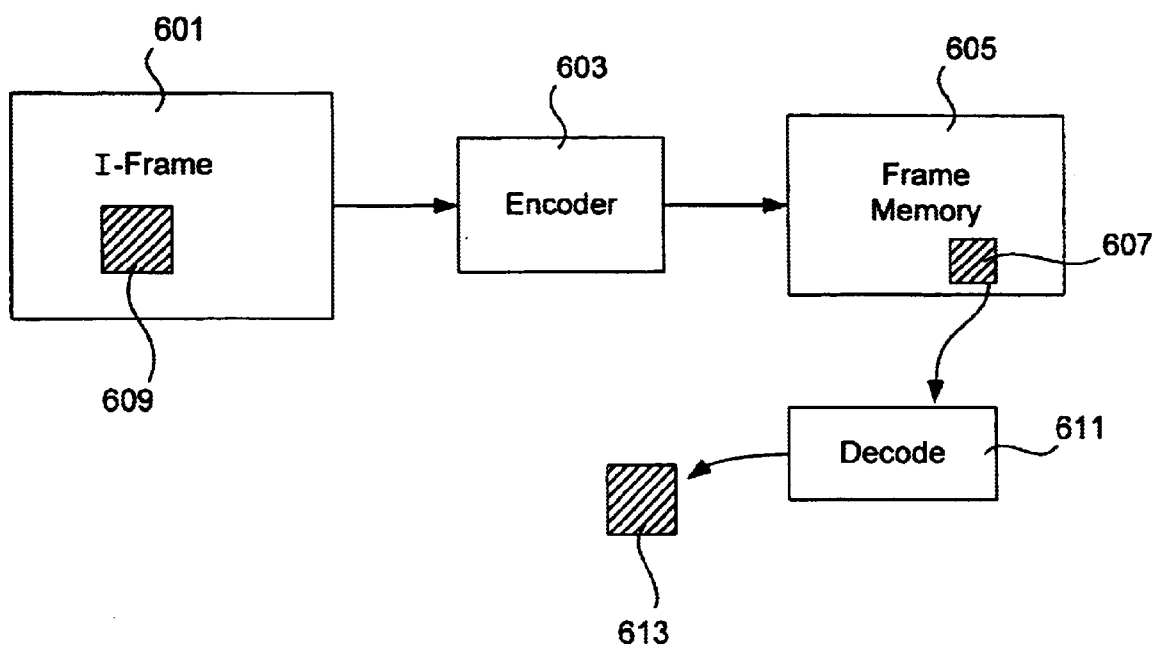
FIG. 6 is a block diagram of an I-Frame being encoded and compressed into a frame memory.

FIG. 6 is a block diagram of an I frame being encoded and compressed into frame memory. The entire I frame is coupled into an encoder 603 that compresses the data within the I frame and places it within the frame memory. The area in the macroblock 609 has now been compressed and is represented by an area 607 within the frame memory. Assuming that the macroblock needed is macroblock 609, the compressed version 607 of macroblock 609 can be accessed, and is contained within the frame memory 605 and decoded in a decoder 611. Then, the result of the decoding process is a macroblock 613.

The macroblock 613 can be a perfect copy of the macroblock 609. Alternatively, it may have some loss depending upon the amount of compression that encoder 603 is introducing into the data within the I frame. For example, if a great amount of compression is desired, then the higher frequency components of the macroblock 607 may be discarded. In this case, the resulting decoded block 613 will be a degraded version of the original macroblock 609. Although this conventional solution helps to reduce the amount of frame memory required, it still does not address the problem of finding the particular macroblock within the frame memory. Nor does it address the problem of actually sizing the frame memory.

Now, in combination with the above description of an MPEG-2 signal transmission process, the present invention may be more fully understood by the following description with reference to FIGS. 7–32.

Figure 7A:
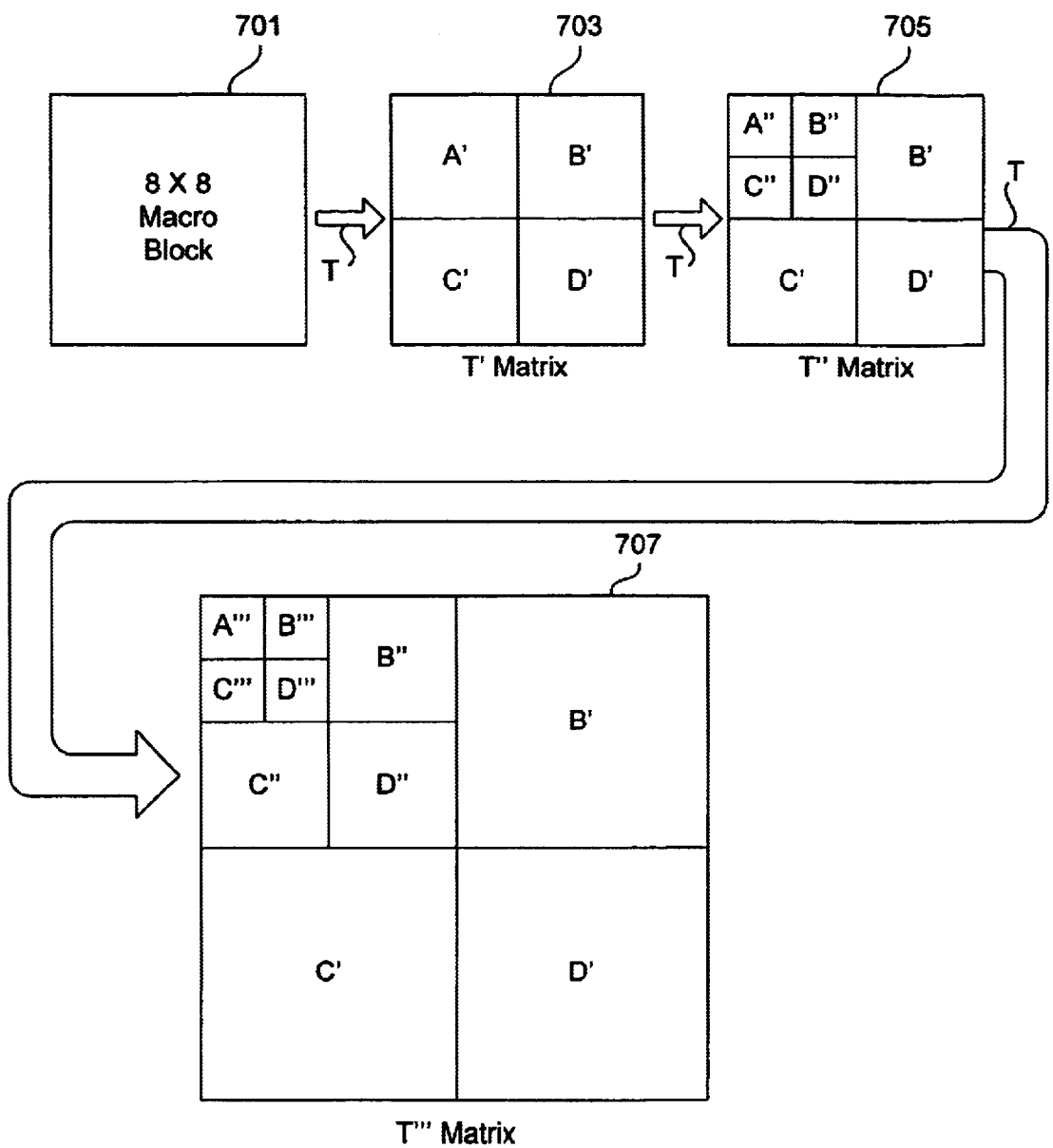
FIG. 7A is an exemplary graphic representation of the "T" transformation process, that comprises an exemplary transform that may be used in embodiments of the invention.

In FIG. 7A, an exemplary 8×8 macroblock 701 is accepted by the encoder 603 of FIG. 6. The encoder 603 then applies a "T" transform to the 8×8 macroblock 701 and creates a "T'" Matrix 703. The T' Matrix 703 is also an 8×8 data structure, but it is divided into four subsections comprising A', B', C' and D'. Each subsection A', B', C', and D' of the T' Matrix 703 comprises a 4×4 set of data coefficients, as illustrated in FIG. 7A. The A' subsection portion of the T' Matrix 703 represents the previous 8×8 macroblock 701 with the higher frequency components removed. In other words, the A' portion of the T' Matrix 703 is an averaging function, as will be discussed below.

The T' Matrix 703 is then once again operated on by the "T" transform. When the T' Matrix 703 is operated upon by the "T" transform, only the A' section is operated upon, as illustrated by the T" Matrix 705 of FIG. 7A.

Thus, the A' section of the T' Matrix 703 is divided into the four equal subsections A", B", C", D" in the T" Matrix 705. Each subsection A", B", C", D" represents a 2×2 block of data. The A" portion of the T" Matrix 705 represents an averaging of the A' block of the T' Matrix 703. In other words, the A" subsection of the T" Matrix 705 is an averaging of the A' section of the T' Matrix 703. Thus, the A" subsection of the T' Matrix 705 is merely a lower frequency version of the A' subsection of the T' Matrix 703.

The "T" transform is then applied once again, this time to the T'" Matrix 705. In this case, the "T" transform operates only on the A" subsection of the T'" Matrix 705. The resulting T'" Matrix 707 is also shown in FIG. 7A. In creating the T'" Matrix 707, the A" subsection of the T'" Matrix 705 is the only section operated on by the transform.

The transform "T" accepts the A" subsection of the T'" Matrix 705 and generates four sub-subsections A'", B'", C'" and D'" within the T'" Matrix 707. Each of these sub-subsections A'", B'", C'" and D'" of the T'" Matrix 707 comprises a single data point. Therefore, the A'" sub-subsection of the T''' Matrix 707 represents an average of the entire T''' Matrix 707. In other words, sub-subsection A''' comprises a lower frequency version of the double prime subsections of the T'' Matrix 705. Thus, in this example, sub-subsection A''' also comprises the average of the entire T''' Matrix 707.

As illustrated in FIG. 7A, this process of successively allying the "T" transform to the macroblock 701, and then to the resultant T' Matrix 703, and then yet again to the resultant T'' matrix 705, so as to generate the resultant T''' Matrix 707, preferably comprises a reversible process. This transform process is referred to as a hierarchical transform. Because the successive application of the "T" transform is a reversible process, the original 8×8 macroblock 701 can be recreated from the T''' Matrix 707.

More specifically, the 8×8 macroblock 701 comprises the original picture information. However, the A' section of the T' Matrix 703 comprises a lower frequency version of the 8×8 macroblock 701. Also, the A'' section of the T'' Matrix 705 comprises a still lower frequency version of the 8×8 macroblock 701. Finally, the A''' section of the T''' Matrix 707 comprises the lowest frequency version of the 8×8 macroblock 701, in this example. Because A''' is a single point, it actually comprises the average of the 8×8 macroblock 701.

Figure 7B:
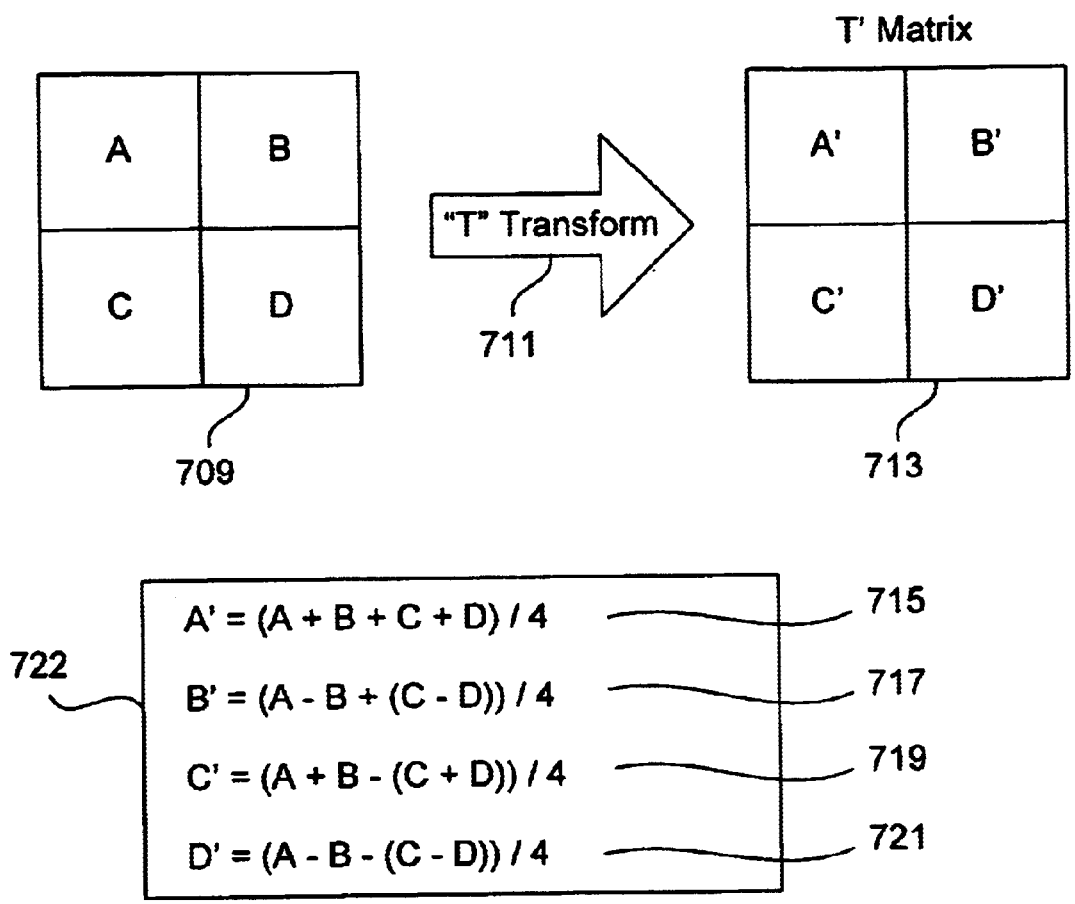
FIG. 7B is an exemplary graphic illustration of a single iteration of the "T" transform in the production of a "T" Matrix.

FIG. 7B is a graphic illustration of an example of a single iteration of the "T" transform in the production of a T' Matrix. Matrix 709 is an exemplary matrix that has been divided into four quadrants, A, B, C and D. It can be assumed for the present example that A, B, C and D each represent a single point.

In FIG. 7B, the "T" transform 711 is applied to the matrix 709. The result is a T' Matrix 713 that also contains the four points labeled A', B', C' and D'. The four equations 715, 717, 719, 721 represent the equation set 722 that, in turn, represents a specific example of the "T" transform 711.

For example, the A' equation 715 illustrates how to create the A' point, or subsection, of the T' Matrix 713 from the A, B, C and D sections of the matrix 709. In this example, A' is equal to $(A+B+C+D)/4$. It is clear from the A' equation 715 that A' is an average of the A, B, C and D sections. Analogously, the B' section is created from the B' equation 717. The B' equation 717 shows that B' is equal to $(A-B+(C-D))/4$. Also, the C' section of the T' Matrix 713 is created by the C' equation 719. The C' equation 719 sets C' equal to $(A+B-(C+D))/4$. Finally, the D' section of the T' Matrix 713 is generated from the D' equation 721, where D' is equal to $(A-B-(C-D))/4$.

FIG. 7C is a graphic illustration of an MPEG macroblock 723. FIG. 7C also illustrates an exemplary T' Matrix 725 that results from the application of a "T" transform equation to the MPEG macroblock 723. Here, the exemplary MPEG macroblock 723 comprises an 8×8 matrix, and thus may represent, e.g., an 8×8 MPEG luminance macroblock. The MPEG macroblock 723 comprises values $A_1$ through $A_{16}$, $B_1$ through $B_{16}$, $C_1$ through $C_{16}$ and $D_1$ through $D_{16}$.

The T' Matrix 725 comprises the subvalues $A'_1$ through $A'_{16}$, $B'_1$, through $B'_{16}$, $C'_1$ through $C'_{16}$ and $D'_1$ through $D'_{16}$ that are arranged as shown in the T' Matrix 725 of FIG. 7C. As illustrated in FIG. 7C, these subvalues are divided into four sections in the T' Matrix 725. In the T' Matrix 725, the first of these four sections is located in the upper left quadrant, and is defined by the location of $A'_1$ through $A'_{16}$. Analogously, the upper right quadrant comprises the location of $B'_1$ throught $B'_{16}$. Also, the lower left quadrant comprises the location of $C'_1$ throught $C'_{16}$, and $D'_1$ throught $D'_{16}$ are located in the lower right quadrant of the T' Matrix 725.

The "T" transform equation set 734 comprises four exemplary equation 727, 729, 731, 733. The $A'_N$ equation 727 set $A'_N$ equal to $(A_N+B_N+C_N+D_N)/4$. The $B'_N$ equation 729, of the "T" transform equation set 734, sets $B'_N$ equal to $(A_N-B_N+(C_N-D_N))/4$. The $C'_N$ equation 731 sets $C'_N$ equal to $(A_N+B_N-(C_N+D_N))/4$. Finally, the $D'_N$ equation 733 sets $D'_N$ equal to $(A_N-B_N-(C_N-D_N))/4$. This "T" transform equation set 734 is computed for N=1 to N=16.

FIG. 7D is a graphic illustration of an exemplary application of the "T" transform to the $A'_1$ through $A'_{16}$ section of the T' Matrix 725 of FIG. 7C. As shown in FIG. 7D, the $A'_1$ through $A'_{16}$ section of the T' Matrix 725 is represented by the 4×4 first matrix 735. The elements of the first matrix 735 are relabeled in the second matrix 737. This relabeling is to facilitate the next step of the "T" transform. Thus, $A'_1$ of the first matrix 735 is relabeled as $A'_{17}$ of the second matrix 737. Analogously, $A'_2$ of the first matrix 735 is relabeled as $B'_{17}$ of the second matrix 737. Also, $A'_5$ is relabeled as $C'_{17}$ of the second matrix 737, and $A'_6$ of the first matrix 735 is relabeled as $D'_{17}$ of the second matrix 737. In like manner, all of the elements of the first matrix 735 are relabeled in the second matrix 737 as shown in FIG. 7D.

The "T" transformation is then applied to the second matrix 737 resulting in the third matrix 739. The third matrix 739 comprises members $A''_{17}$, $A''_{18}$, $A''_{19}$, $A''_{20}$, $B''_{17}$, $B''_{18}$, $B'_{19}$, $B'_{20}$, and so forth, as is shown in the third matrix 739 of FIG. 7D. The "T" transform equation group 749 comprises four equations 741, 743, 745, 747. The equation group 749 is computed for N=17 through N=20. The $A''_{17}$ equation 741 sets $A''_N$ equal to $(A'_N+B'_N+C'_N+D'_N)/4$. Analogously, the $B''_N$ equation 743 sets $B''_N$ equal to $(A'_N-B'_N+(C'_N-D'_N))/4$. Also, the $C''_N$ equation 745 sets $C''_N$ equal to $(A'_N+B'_N-(C'_N+D'_N))/4$, and the $D''_N$ equation 747 sets $D_{41\ N}$ equal to $(A'_N-B'_N-(C'_N-D'_N))/4$.

FIG. 7E is a graphic illustration of an exemplary application of the "T" transform to the A'' section of the T'' Matrix 705 of FIG. 7A. The fourth matrix 751 represents the A'' section of the T'' Matrix 705.

As shown in FIG. 7E, the A'' section of the fourth matrix 751 is then relabeled as shown in the fifth matrix 753. Thus, the matrix element $A''_{17}$ of the fourth matrix 751 is relabeled as $A''_{21}$ of the fifth matrix 753. Analogously, the $A''_{18}$ element of the fourth of matrix 751 is relabeled as $B''_{21}$ of the fifth matrix 753. Also, the $A''_{19}$ element of the fourth matrix 751 is relabeled as $C''_{21}$ of the fifth matrix 753, and the $A''_{20}$ element of the fourth matrix 751 is relabeled as $D''_{21}$ of the fifth matrix 753. The "T" transform is then applied and the sixth matrix 755 is the result.

Here, the "T" transform equation list 757 also comprises four equations 759, 761, 763 765. The $A'''_N$ equation 759 sets $A'''_N$ equal to $(A''_N+B''_N+C''_N+D''_N)/4$. The $B'''_N$ equation 761 sets $B'''_N$ equal to $(A''_N-B''_N+(C''_N-D''_N))/4$. Also, the $C'''_N$ equation 763 sets $C'''_N$ equal to $(A''_N+B''_N-(C''_N+D''_N))/4$. Finally, the $D'''_N$ equation 765 sets $D'''_N$ equal to $(A''_N-B''_N-(C''_N-D''_N))/4$. In each of these four equations that comprise the "T" transform equation list 757, N is equal to 21.

Next, the general process for applying the "T" transform to a matrix is further clarified in the following figures. Also, a specific example is utilized to illustrate the transform being repeatedly applied. Again, for clarity, the foregoing discussion utilizes an exemplary 8×8 MPEG luminance macroblock.

Figure 14:
FIG. 14 is a tabular example of an MPEG 8×8 luminance macroblock, with the coefficients labeled to illustrate the application of the "T" transform.

FIG. 14 illustrates a tabular example of an MPEG 8×8 luminance macroblock 1501, with the coefficients labeled with reference values in order to illustrate an application of the "T" transform. The MPEG3 macroblock 1501 comprises 8 columns by 8 rows. The coefficients located in the rows and columns represent elements in the macroblock 1501, and are labeled a, through $a_{16}$, $b_1$ through $b_{16}$, $c_1$ through $c_{16}$ and $d_1$ through $d_{16}$.

FIG. 15 is a graphical representation illustrating an exemplary computation of the first coefficients of the four sectors of the T' matrix 1623. Examples of the first four elements of the MPEG macroblock 1501 are shown in FIG. 15. Thus, element $a_1$ equals 151, element $b_1$ equals 139, element $c_1$ equals 136, and element $d_1$ equals 132. These elements are used in the first iteration of the "T" transform.

Now, by utilizing the $A'_N$ equation 727 of FIG. 7C, the first element $a'_1$ is computed. Then, the values for the elements $a_N$, $b_N$, $c_N$ and $d_N$ are substituted into the $A'_N$ equation 727. The result appears in equation 1603 of FIG. 15. Equation 1603 computes $a'_1$ as being equal to 142.

It should be noted that equation 1603 utilizes the "approximately equal" sign, instead of using an "equal" sign. This approximately equal sign is utilized because the process of division is preferably accomplished through the use of a binary shift mechanism, as will be described later. This binary shift mechanism is preferably utilized because of the increased speed as compared to a normal divide type algorithm. However, this binary shift method produces some truncation error, because parts of the binary numbers are dropped for computational purposes.

Analogously to the above $A'_N$ equation 727 calculation, the $B'_N$ equation 729 of FIG. 7C is represented by equation 1605 of FIG. 15 to generate the B' result. As shown in FIG. 15, the values from the MPEG macroblock 1501 are substituted into the $B'_N$ equation 729, and the result is seen in equation 1605. In this example, when the result of the equation 1605 is computed, $b'_1$ is calculated and set equal to 1. This calculated value for $b'_1$ is placed into the b section 1617 of the T' Matrix 1623. In an analogous manner, the $C'_N$ equation 731 of FIG. 7C becomes equation 1607 of FIG. 15 when the values are substituted in. The result is placed into the c section 1619 of the T' Matrix 1623. Also, the $D'_N$ equation 733 of FIG. 7C is used to compute the first element of the d section 1621 of the T' Matrix 1623 of FIG. 15.

Next, FIG. 16 is a graphical illustration of an exemplary computation of the first through fourth coefficients in the a section 1613 of the T' Matrix 1623 of FIG. 15, where the coefficients are obtained from Rows 1 and 2 of the example macroblock 1501 of FIG. 15. In FIG. 16, Rows 1 and 2 of the MPEG macroblock 1501 are recreated. The individual coefficients from Row 1, Column 1 and 2, and Row 2, Column 1 and 2 that are obtained from the MPEG macroblock 1501 are used to compute the a coefficient, that will reside in Row 1, Column 1 of the T' Matrix 1703. Analogously, the values of the coefficients in Columns 3 and 4 of Rows 1 and 2 are used to compute the element that will reside in Row 1, Column 2, of the T' Matrix 1703. Also, the elements from Row 1, Columns 5 and 6, and Row 2, Columns 5 and 6, are next used to compute the element that will occupy Row 1, Column 3 of the T' Matrix 1703. Finally, the elements from Row 1, Columns 7 and 8 and Row 2 Columns 7 and 8 are used to compute the element that will reside in Row 1, Column 4, of the T' Matrix 1703. The elements in Row 1, Columns 1, 2, 3 and 4 of FIG. 16 are all computed using the $A'_N$ equation 727 of FIG. 7C.

The remainder of the a section 1613 of the T' Matrix 1623, as illustrated in FIGS. 15 and 16, will also use the $A'_N$ equation 727 of FIG. 7C to compute the elements. In an analogous manner, the b section 1617 of the T' Matrix 1623 will be computed using the $B'_N$ equation 729 of the "T" transform in FIG. 7C. Also in like manner, the c section 1619 of the T' Matrix 1623 will be computed using the $C'_N$ equation 731, and the d section 1621 of the T' Matrix 1623 will be computed using the $D'_N$ equation 733.

Next, FIG. 17 is a graphical illustration of an exemplary computation of the $5^{th}$ through $8^{th}$ coefficients in the a section 1613 of the T' Matrix 1623 that are obtained from Rows 3 and 4 of the example MPEG macroblock 1501 of FIG. 15. The $A'_N$ equation 727 of FIG. 7C is used to create Row 2, Columns 1 through 4 of the T' Matrix 1703 of FIG. 17, that are obtained from Rows 3, Column 1 through 8, and Row 4, Column 1 through 8, of the MPEG macroblock 1501 of FIG. 15. In like manner, the b section 1617 of FIG. 15 is created from the $B'_N$ equation 729 of FIG. 7C. Similarly, the c section 1619 $5^{th}$ through $8^{th}$ coefficients are created using the $C'_N$ equation 731, and the d section 1621 $5^{th}$ through $8^{th}$ coefficients are created using the $D'_N$ equation 733.

Now, FIG. 18 is a graphical illustration of an exemplary computation of the $9^{th}$ through $12^{th}$ coefficients in the a section 1613 of the T' Matrix 1623, that are obtained from Rows 5 and 6 of the example MPEG macroblock 1501 of FIG. 15. Analogously, Row 3, Columns 1, 2, 3, and 4 of the T' matrix 1623 are created from the MPEG macroblock 1501 Row 5, Columns 1–8 and Row 6, Columns 1–8.

Next, FIG. 19 is a graphical illustration of an exemplary computation of the $13^{th}$ through $16^{th}$ coefficients in the a section 1613 of the T' Matrix 1623 from Rows 7 and 8 of the example MPEG macroblock 1501. Equation 727 is used to transform the elements from Row 7, Columns 1 through 8, and Row 8, Columns 1 through 8 of the MPEG macroblock 1501 into the $13^{th}$ through the $16^{th}$ elements of the fourth row of the a section of the T' Matrix 1703, as shown in FIG. 19.

Figure 20:
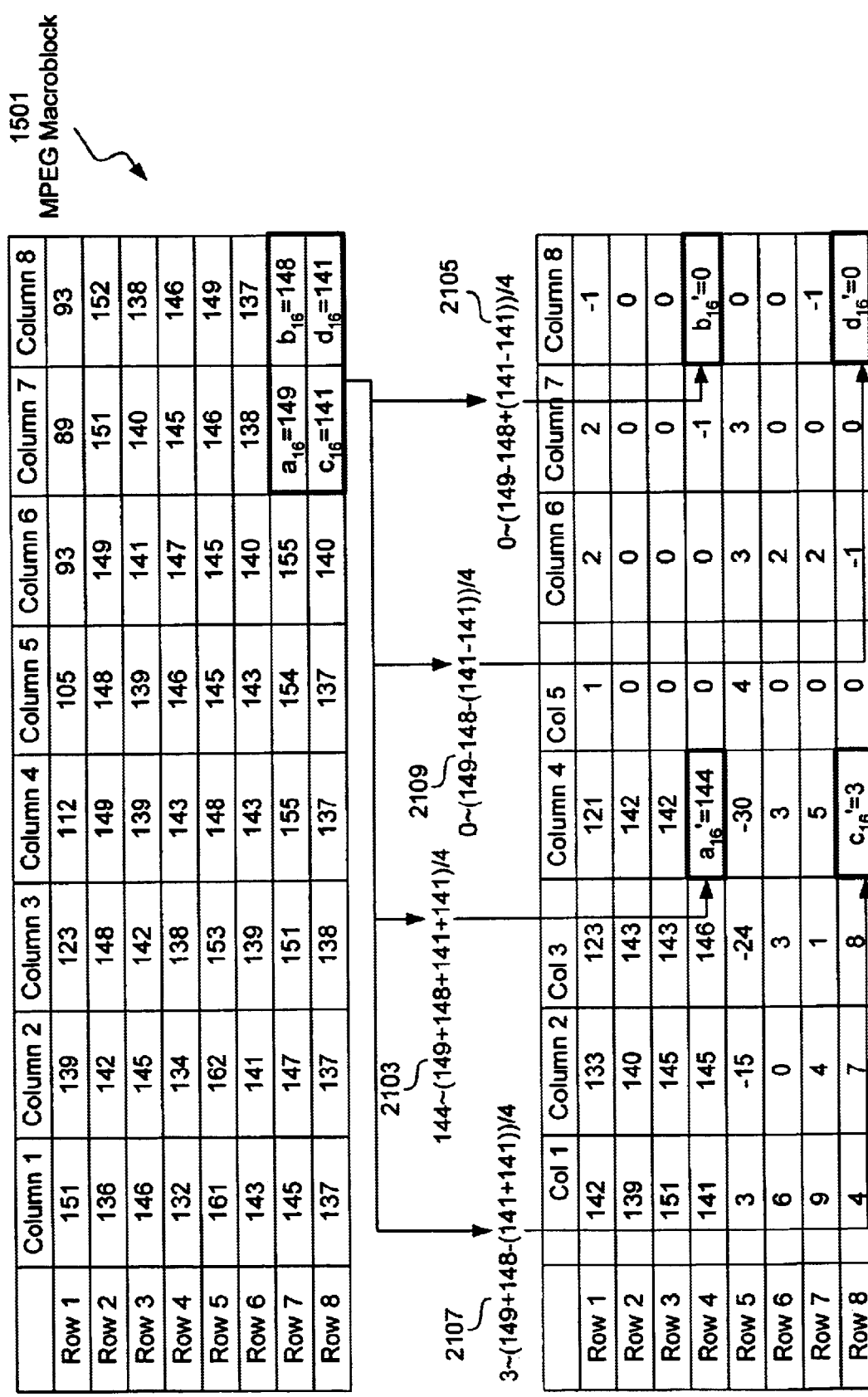
FIG. 20 is an exemplary graphical representation of an illustrative computation of the final coefficients in each of the four sections that comprise the "T'"" Matrix.

FIG. 20 is a graphical representation of an exemplary illustrative computation of the final coefficients in each of the four sections that comprise the T' Matrix 1703. The coefficients $a_{16}$, $b_{16}$, $c_{16}$, and $d_{16}$ of the MPEG macroblock 1501 shown in FIG. 15 are used to compute $a'_{16}$, $b'_{16}$, $c'_{16}$ and $d'_{16}$, of the T' Matrix 1703 shown in FIG. 20. These elements that are obtained from the MPEG macroblock 1501 are transformed using the "T" transform equation set 734 of FIG. 7C. Thus, the $a'_{16}$ coefficient is computed using the $A'_N$ equation 727 of FIG. 7C. After substituting the values into the $A'_N$ equation 727, the results are expressed in equation 2103 as shown in FIG. 20. Thus, the equation 2103 computes the value of the coefficient $a'_{16}$ as 144.

Analogously, when the respective values for b' are substituted into the $B'_N$ equation 729 of FIG. 7C, the FIG. 20 equation 2105 results, and $b'_{16}$ is thus computed. Also, when the respective values are substituted into the $C'_N$ equation 731, equation 2107 results, and the value of $C'_{16}$ is computed. Finally, when the respective values are substituted in for the $D'_N$ equation 733, equation 2109 results and thereby the value of $d'_{16}$, is computed, thus comprising the last element in the FIG. 20 T' Matrix 1703.

Figure 21:
FIG. 21 is an exemplary tabular illustration of the four (a, b, c, and d) quadrants that comprise the T' Matrix.

FIG. 21 is an exemplary tabular illustration of the four (a, b, c, and d) quadrants that comprise the T' Matrix 2201. The four quadrants of the T' Matrix 2201 are equally divided. The a section 2203 of the T' Matrix, also abbreviated as a' 2203, occupies Row 1 through Row 4, and Column 1 through Column 4. The b section 2205 of the T' Matrix 2201, also abbreviated as b' 2205, occupies Row 1 through Row 4, and Columns 5–8. The c section 2207 of the T' Matrix 2201, abbreviated as c' 2207, occupies Rows 5–8 and Columns 1–4. Finally, in section d 2209 of the T' Matrix 2201, also abbreviated as d' 2209, are the values that occupy Rows 5–8, and Columns 5–8 of the T' Matrix 2201.

FIG. 22 is a graphical illustration of an exemplary computation of the first a, b, c and d coefficients in the T'' Matrix 2315 from the coefficients of the a section 2203 of the T' Matrix 2201 of FIG. 21. Thus, these computations comprise just one specific exemplary illustration of the computations described in FIG. 7D.

For example, the coefficients from the a section 2203 of the T' Matrix 2201 that reside in Row 1, Columns 1 and 2, and Row 2, Columns 1 and 2 of the T' Matrix 2201 of FIG. 21, are used to compute the coefficients for the T'' Matrix 2315 of FIG. 22. By substituting the values from Row 1, Columns 1 and 2, and Row 2, Columns 1 and 2 of the T' Matrix 2201 of FIG. 21, the coefficients may be computed for the T'' Matrix 2315 of FIG. 22. These computed coefficients will then be inserted into Row 1, Column 1; Row 1, Column 3; Row 3, Column 1; and Row 3, Column 3 of FIG. 22, respectively.

Thus, the values from the T Matrix 2301 of FIG. 20 are substituted into the "T" transform equation group 749 of FIG. 7D. For example, when the values are substituted into the $A'_N$ equation 741 of FIG. 7D, the equation 2307 of FIG. 22 results. The result of this computation, i.e., the coefficient of 138, is then inserted into Row 1, Column 1 of the T'' Matrix 2315 of FIG. 22.

Likewise, the $B''_N$ equation 743 of FIG. 7D has the respective values substituted in for the variables and becomes the equation 2309 of FIG. 22. The result of the computation of equation 2309 is a coefficient that is inserted into Row 1, Column 3 of the T'' Matrix 2315. Also, the respective values for the $C''_N$ equation 745 are substituted in to replace the variables, and the result is the equation 2311. In this example, this computation of equation 2311 results in a coefficient of −1, that is then inserted into Row 3, Column 1 of the T'' Matrix 2315.

In like manner, the $D''_N$ equation 747 has the respective values substituted from the T' Matrix 2201. The result is the equation 2313 of FIG. 22. This computation of the equation 2313 results in the coefficient 2 being written into Row 3, Column 3 of the T'' Matrix 2315.

Next, FIG. 23 is an exemplary graphical illustration of the first and second coefficients of the T'' Matrix 2315, that are generated from the coefficients within the a section 2203 of the T' Matrix 2201 of FIG. 21, that is also represented in part as the T' Matrix 2401 of FIG. 23. The coefficient for Row 1, Column 1 of the T'' Matrix 2315 is generated from the coefficients in Row 1, Columns 1 and 3, and, Row 2, Columns 1 and 2 of the T' Matrix 2401, as shown in FIG. 23.

FIG. 24 is a graphical illustration of an exemplary creation of coefficients from Row 1, Columns 1 and 2 of the T'' Matrix 2315. For example, Row 3, Columns 1 and 2, and Row 4, Columns 1 and 2 of the T' Matrix 2401 are used to compute the coefficient value that is then written into Column 1, Row 2 of the T'' Matrix 2315. In like manner, the coefficients from Row 2, Columns 3 and 4, and Row 4, Columns 3 and 4 of the T' Matrix 2401 are used to compute the coefficient that is inserted into Row 2, Column 2 of the T''' Matrix 2315.

FIG. 25 is a graphical illustration of an exemplary computation of the last a, b, c and d section coefficients of the T''' Matrix 2315 as they are calculated from the coefficients of a section of the T' Matrix 2401. Thus, the coefficients from Row 3, Columns 3 and 4, and Row 4, Columns 3 and 4 of the T' matrix 2401 are substituted into the "T" transform equation group 749 of FIG. 7D, and are then used to compute the values for the coefficients that appear in Row 2, Column 2; Row 2, Column 4; Row 4, Column 2; and Row 4, Column 4 of the T''' Matrix 2315 in FIG. 25, respectively. The coefficient values that are obtained from Row 2, Columns 3 and 4 and Row 4, Columns 3 and 4, of the T' Matrix 2401, are then substituted into the $A'_N$ equation 741 of FIG. 7D. The result is equation 2603 of FIG. 25. This computation of equation 2603 results in a coefficient being inserted in Row 2, Column 2 of the T''' Matrix 2315.

The coefficients from Row 3, Columns 3 and 4, and Row 4, Columns 3 and 4 of the T' Matrix 2401 are inserted into the $B''_N$ equation 743 of FIG. 7D. The result is equation 2605 of FIG. 25. This computation of equation 2605 results in a coefficient value of zero being inserted into Row 2, Column 4 of the T''' Matrix 2315.

Analogously, the coefficients from Row 3, Columns 3 and 4 and Row 4, Columns 3 and 4 are substituted into the $C'''_N$ equation 745. The result is equation 2607. When equation 2607 is calculated, the result is a coefficient of −1, that is inserted into Row 4, Column 2 of the T''' Matrix 2315.

In like manner, the coefficients from Row 3, Columns 3 and 4, and Row 4, Columns 3 and 4 from the T' Matrix 2401 are inserted into the $D''_N$ equation 747 of FIG. 7D. The result is equation 2609, that when computed, results in a coefficient of zero. This coefficient of zero, that is computed from the equation 2609, is then written into Row 4, Column 4 of the T''' Matrix 2315 of FIG. 25.

Figure 26:
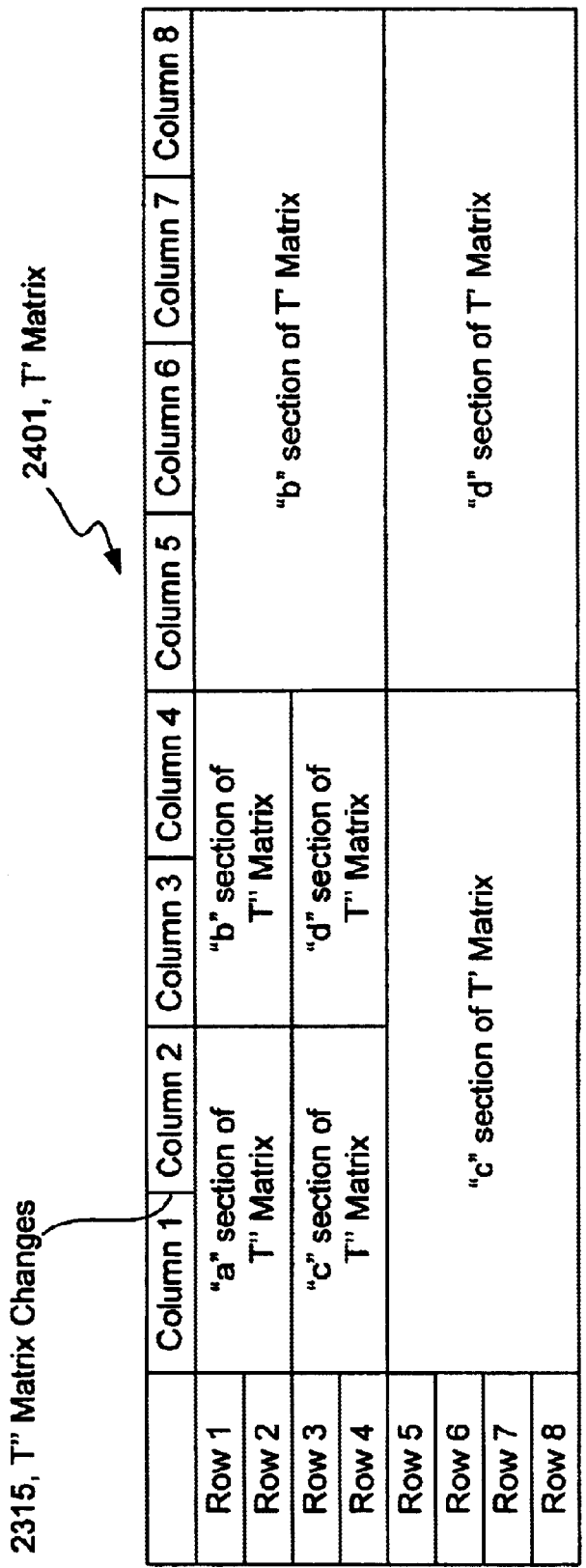
FIG. 26 is a graphical illustration of an exemplary resulting matrix after two iterations of the "T" transform.

FIG. 26 is a graphical illustration of an exemplary resulting matrix after the first two iterations of the "T" transform. FIG. 26 illustrates the different sections that comprise the T and T' Matrices. The portion of the T' Matrix 2401 shown in FIG. 26 comprises the entire 8 rows and 8 columns of FIG. 25, except for section a. The T''' Matrix 2315 comprises all 8 rows and 8 columns of FIG. 26. However, the only portion of the T''' Matrix 2315 that is changed from the T' Matrix 2401 of FIG. 21 is the shaded section of the T''' Matrix 2315 in FIG. 26 that is analogous to the section a of the T' Matrix 2401 of FIG. 25. In other words, the a section of the T' Matrix 2401 is changed, and thus results in the T''' Matrix 2315. This changed portion is represented by the shaded section of FIG. 26.

FIG. 27 is an illustration of an exemplary T' Matrix 2401 with an indication of a darkened border that defines the upper left quadrant, i.e., the FIG. 26 shaded section of the T' Matrix 2315, that is changed in order to create the T'' Matrix 2515.

FIG. 28 is a graphical illustration of an exemplary computation of the T''' Matrix 2319 from the section a 2915 of the T''' Matrix 2315. The T''' Matrix 2913 is created by applying the "T" transform equation list 757 of FIG. 7E. The "T" transform equation list 757 comprises four equations: the $A'''_N$ equation 759, the $B'''_N$ equation 761, the $C'''_N$ equation 763, and the $D'''_N$ equation 765. The a portion 2915 of the T''' Matrix 2315 comprises Row 1, Columns 1 and 2, and Row 2, Columns 1 and 2. These values are substituted in for the "T" equation list 757.

For example, substituting the respective values into the $A'''_N$ equation 759 of FIG. 7E results in the equation 2907 as shown in FIG. 28. The result of this computation of the $A'''_N$ equation 759 is the coefficient of 139, that is then inserted as the coefficient into Row 1, Column 1 of the T''' matrix 2913. Analogously, when the corresponding values from the T'' Matrix 2315 are inserted into the $B'''_N$ equation 761, the result is the equation 2909. This computation of equation 2909 results in the coefficient of 2, that is then inserted into Row 1, Column 2 of the T''' Matrix 2913. Next, the values from Row 1, Columns 1 and 2, and Row 2, Columns 1 and 2 of the T" Matrix are inserted into the $C'''_N$ equation 763, thereby creating equation 2905. The computation of equation 2905 results in the coefficient of −4 that is then inserted into Column 1, Row 2 of the T'" Matrix 2913.

In like manner, the coefficient values from Row 1, Columns 1 and 2, and Row 2, Columns 1 and 2, that are obtained from the T" Matrix 2315 are inserted into the $D'''_N$ equation 765 of FIG. 7E, and the equation 2911 of FIG. 28 results. When the equation 2911 is computed, the resulting coefficient of 1 is then inserted into Row 2, Column 2 of the T'" Matrix 2913.

Figure 29:
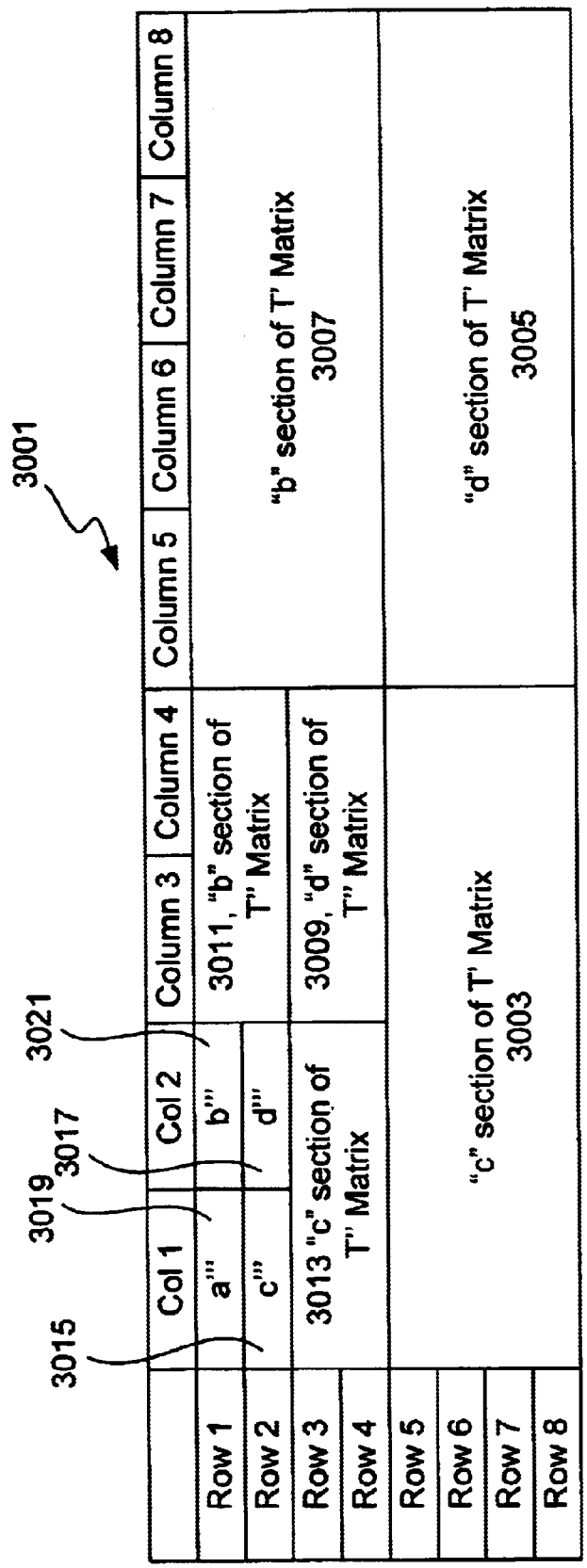
FIG. 29 is a tabular illustration of an exemplary resulting matrix after three iterations of the "T" transform.

FIG. 29 is an exemplary tabular illustration of a resulting T'" Matrix 3001 after the first three iterations of the "T" transform. In FIG. 29, the b section 3007 of the previous T' Matrix 2401 of FIG. 25 is left intact, as is the c section 3003 and the d section 3005 of the T' Matrix 2401. Also, within the T'" Matrix 3001 of FIG. 29, the c part 3113 of the T" Matrix 2315 of FIG. 25 is left intact, as is the b part 3011 and the d part 3009 of the T" Matrix 2315. However, the coefficients a'", b'", c'", and d'" 3015, 3019, 3021, 3017 are unique to the T'" Matrix 3001, as shown in FIG. 29.

FIG. 30 is an exemplary tabular illustration of a resulting T'" Matrix 3101 after the first three iterations of the "T" transform are performed. The coefficient 3103 is the coefficient that represents the average of the entire T'" Matrix 3101.

Figure 31:
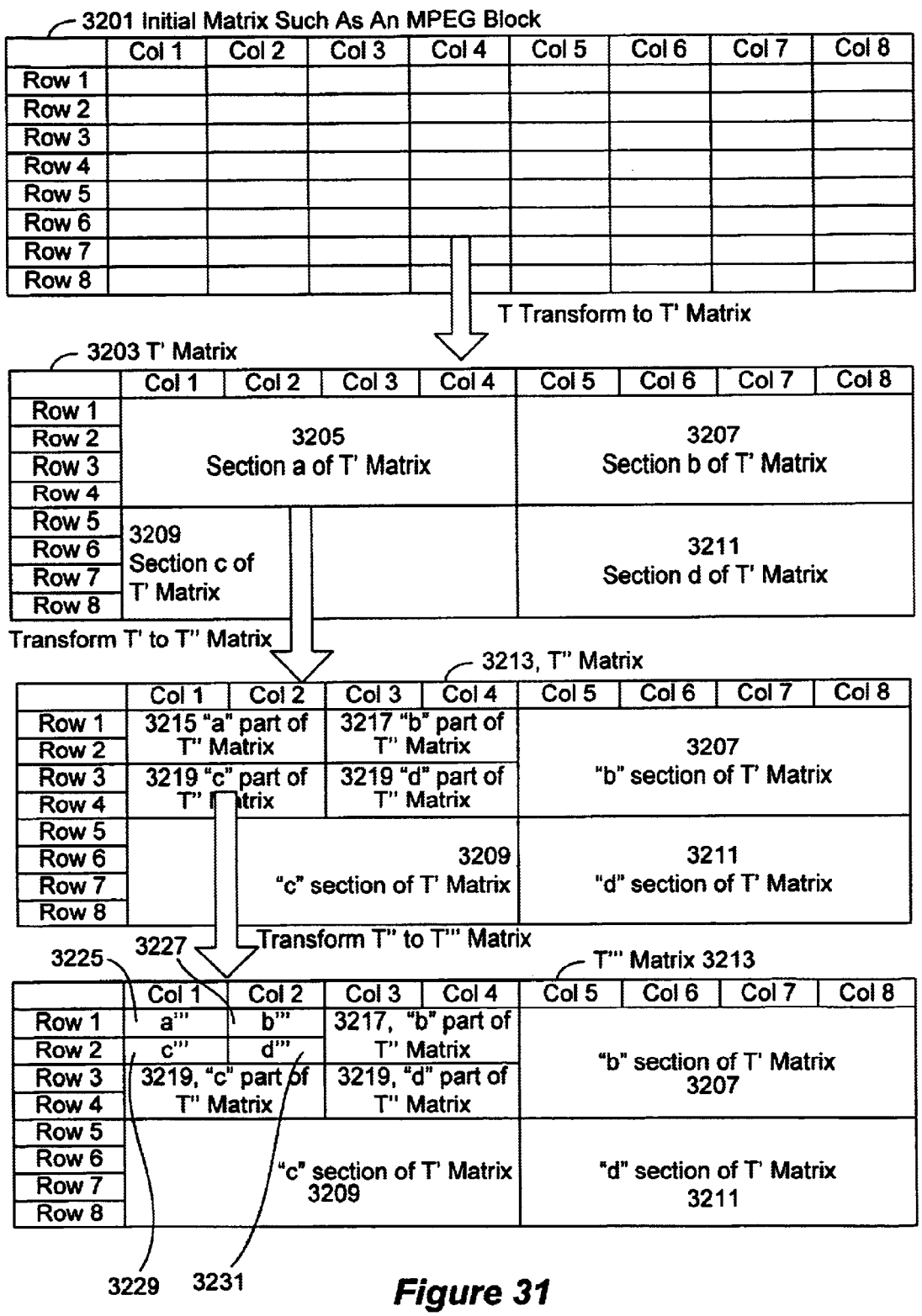
FIG. 31 is an exemplary graphical representation of the three iterations of the "T" transform showing the resultant matrices created.

FIG. 31 is an exemplary graphical representation of the first three iterations of the "T" transforms showing the generation of the resulting matrices. The original or initial 8×8 matrix 3201 represents, e.g., an MPEG luminance block. The "T" transform is first applied to the initial matrix 3201 to create the T' Matrix 3203. The T' Matrix 3203 comprises four different sections, including section a 3205, section b 3207, section c 3209, and section d 3211. The section a 3205 of the T' Matrix 3203 is then used to compute the T" Matrix 3213. The section a of the T' Matrix 3203 is transformed into the T" Matrix 3213. However, all the other sections, i.e., section b 3207, section c 3209, and section d 3211 will remain the same throughout the following two transformations of T" and T'".

Next, as shown in FIG. 31, the section a 3205 of the T' Matrix 3203 is divided into four sections in the T" Matrix 3213. Here, the T" Matrix 3213 comprises the a part 3215, the b part 3217, the c part 3219, and the d part 3219.

Then, the a part 3215 of the T" Matrix 3213 will be transformed to create the T'" Matrix 3213. This a part 3215 of the T" Matrix 3215 is transformed into four sections: the a'" part 3225; the b'" part 3227; the c'" part 3229; and the d'" part 3231.

FIG. 32 is a graphical illustration of an exemplary T'" matrix illustrating the different submatrices that are created. The submatrices are labeled so that their prime level corresponds to the prime level of the matrix in which they were first generated. In other words, the b', the c', and the d' matrix were first created in the T' matrix. Also, the b", the c" matrix, and the d" matrix were created in the T" matrix, and the a'", b'", d'" and d'" matrices were created in the T'" matrix.

Thus, FIG. 32 illustrates a continually compressing transform. The variable "L" represents the number of successive transforms. In a preferred embodiment, this continually compressing transform preferably comprises L=3 successive transforms.

Figure 8:
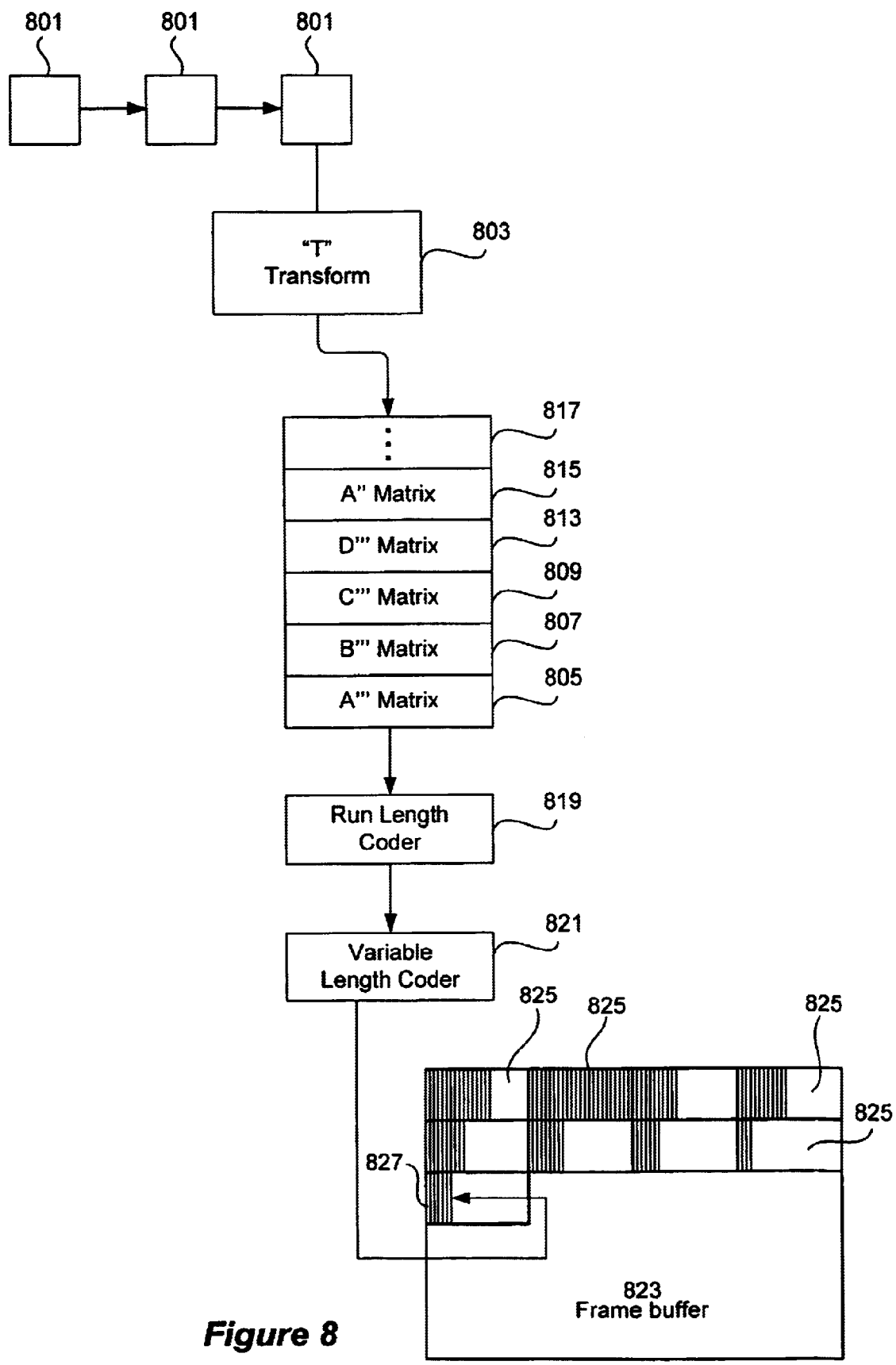
FIG. 8 is an exemplary graphical illustration of an MPEG luminance macroblock being used with a preferred embodiment of the invention.

In another exemplary embodiment, as shown in FIG. 8, an exemplary graphical illustration of an MPEG luminance macroblock is being used with a preferred embodiment of the invention. In FIG. 8, a group of macroblocks 801 are coupled into a "T" transformer 803. The macroblocks 801 are each represented in a matrix form. The "T" transformer then transforms each macroblock 801 matrix into the various submatrices 805, 807, 809, 813, 815, 817, as illustrated in FIG. 8 and defined in FIG. 33.

The submatrices 805, 807, 809, 813, 815, 817 are then coupled into a run-length coder block 819. The actual number of submatrices 805, 807, 809, 813, 815 and 817 that are coupled into the run-length coder will depend upon exactly how much space is allocated in the frame buffer 823.

The frame buffer 823 is divided into a plurality of memory sections 825. Each section is allocated so as to store a portion of the T'" matrix that results from the "T" transform 803. To size the memory sections, or divisions 825 of the frame buffer 823, the user preferably predetermines the maximum amount of loss of detail that can be tolerated in the system in which the frame buffer 823 resides. The data areas or memory sections 825 allotted for storage in the frame buffer 823 will each be preferably somewhat less than the size of a complete macroblock 801.

As the different submatrices 805, 807, 809, 813, 815, 817 are coupled into the run-length coder 819, they are further compressed. The submatrices 805, 807, 809, 813, 815, 817 are then coupled from the run-length coder 819 into a variable-length coder 821, and then into the frame buffer 823. In FIG. 8, the current MPEG block is being written into the memory section, or slot 827, of the frame buffer 823.

The memory sections 825 within the frame buffer 823 may be sized such that the memory sections 825 store a minimum value of detail from an original macroblock 801. This memory section 825 size can be determined by assuming that the run-length coder 819 and the variable-length coder 821 result in either a minimal, or zero, compression of the data stream. Then, a memory section 825 can be sized to contain the minimal amount of data that the user has correlated to an acceptable minimum of detail of a macroblock 801.

For example, if only the average of a macroblock 801 is desired to be coded, then each memory section 825 within the frame buffer 823 may comprise a single coefficient value, such as the part a 3103 value of the T'" matrix of FIG. 30. However, if more detail is needed or desired, then the four new sections 3015, 3017, 3019, 3021 of the T'" matrix 3001 of FIG. 29 could be encoded. If yet more detail is desired, then the b part 3011, the c part 3013, and the d part 3009 of the T'" matrix 3001 of FIG. 29 could be encoded. In other words, a minimum size for the data block memory sections 825, within the frame buffer 823, may be determined by selecting the minimum amount of detail from the macroblock 801 that is acceptable, as illustrated in FIG. 8.

In most cases, the run-length coder 819 and the variable-length coder 821 will result in an additional compression. Thus, the selected acceptable minimal amount of detail would most likely be stored, with some remaining storage available, in each of the memory sections 825. This additional compression may waste memory in some cases, e.g., if the frame buffer 823 is divided up in this manner, into memory sections 825. To help avoid this potential waste of memory, the memory could instead be allocated so as to not only be based upon the minimum size of the memory sections 825 within the frame buffer, but to also be based upon the amount of memory that the memory sections 825 were actually taking up, e.g., in real time.

Thus, various schemes may be implemented, e.g., having a maximum memory section size and having a variable sized memory slice portions that are smaller than the memory section 825 size. This would preclude the wasting of memory space within the frame buffer 823 if a macroblock 801 would compress enough to fit within an area that was smaller than the size of the memory section 825. Various schemes known in the art, such as the utilization of hashing tables for the finding of a particular block, could then be implemented.

Figure 9:
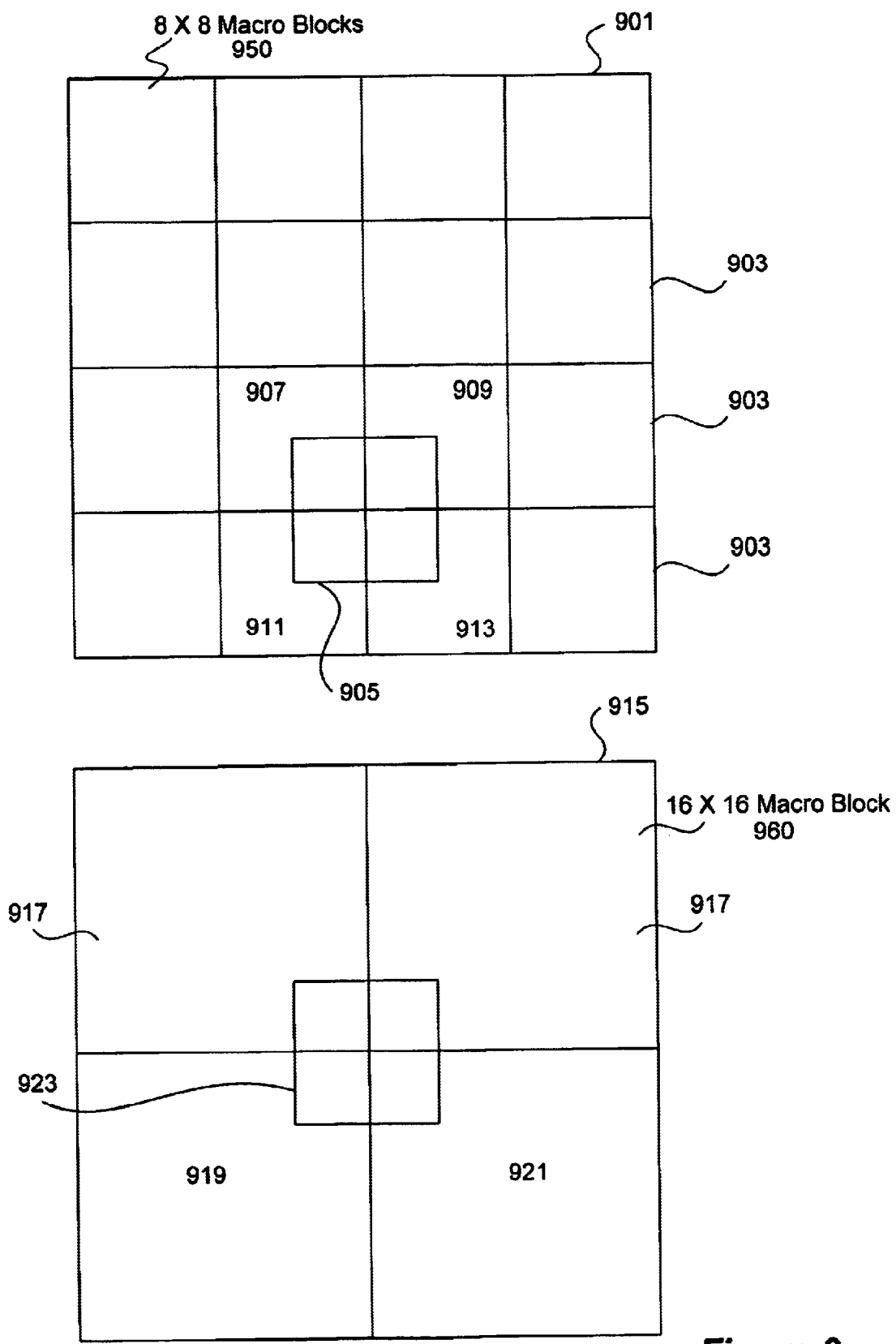
FIG. 9 is an exemplary graphical comparison illustrating a search for a particular picture element in a frame composed of 8×8 macroblocks versus 4×4 macroblocks.

FIG. 9 is an exemplary graphical comparison illustrating a search for a particular picture element in a frame, that is composed of a plurality of 8×8 macroblocks 950, versus a plurality of 16×16 macroblocks 960. In the above examples, it was assumed that the incoming MPEG stream was decoded into a series of luminance macroblocks 801. This assumption was utilized for the purpose of clarity with respect to various embodiments of the present invention.

However, for the purposes of storing the MPEG data into the frame memory, standard MPEG blocks may be used. An example of standard MPEG blocks comprises 8×8 luminous macroblocks and 4×4 chrominance macroblocks. Of course, this is not the only format in which the data can be encoded prior to storage in a frame memory. It is understood that many other macroblock arrangements are available in the practice of the various embodiments of the present invention.

FIG. 9 shows a tradeoff that may exist between different sizes of macroblocks. Memory section 901 comprises a portion of the frame memory. The entire memory section 901 that is illustrated in FIG. 9 is a 32×32 sized memory section, and comprises a plurality of macroblocks 903.

In this example, it is assumed that a picture element 905 might need to be retrieved from the frame memory. As shown in FIG. 9, the picture element 905 is contained partly in the macroblock 907, partly in the macroblock 909, partly in the macroblock 911, and partly in the macroblock 913. However, in order to reconstruct the picture element 905, the four 8×8 macroblocks 907, 909, 911, and 913 must be retrieved.

In contrast, the second picture element 923 represents the same area as the first picture element 905, but within the video frame memory 915. This video frame memory 915 is a 32×32 segment of frame memory. If the second picture element 923 were to be retrieved, then the 16×16 macroblocks 919, 921 would have to be retrieved from the frame memory. The two 16×16 macroblocks 919, 921 represent twice the number of coefficients as do the four 8×8 macroblocks 907, 909, 911, 913.

Although greater compression might be achieved by using the 16×16 macroblocks within the frame memory, the foregoing example illustrates that there is a tradeoff. That is, if the 16×16 macroblocks are used as a basis for the frame memory, then the average amount of coefficient data that will have to be retrieved from the frame memory is larger, as compared to using a frame memory based upon a relatively smaller macroblock.

Figure 10:
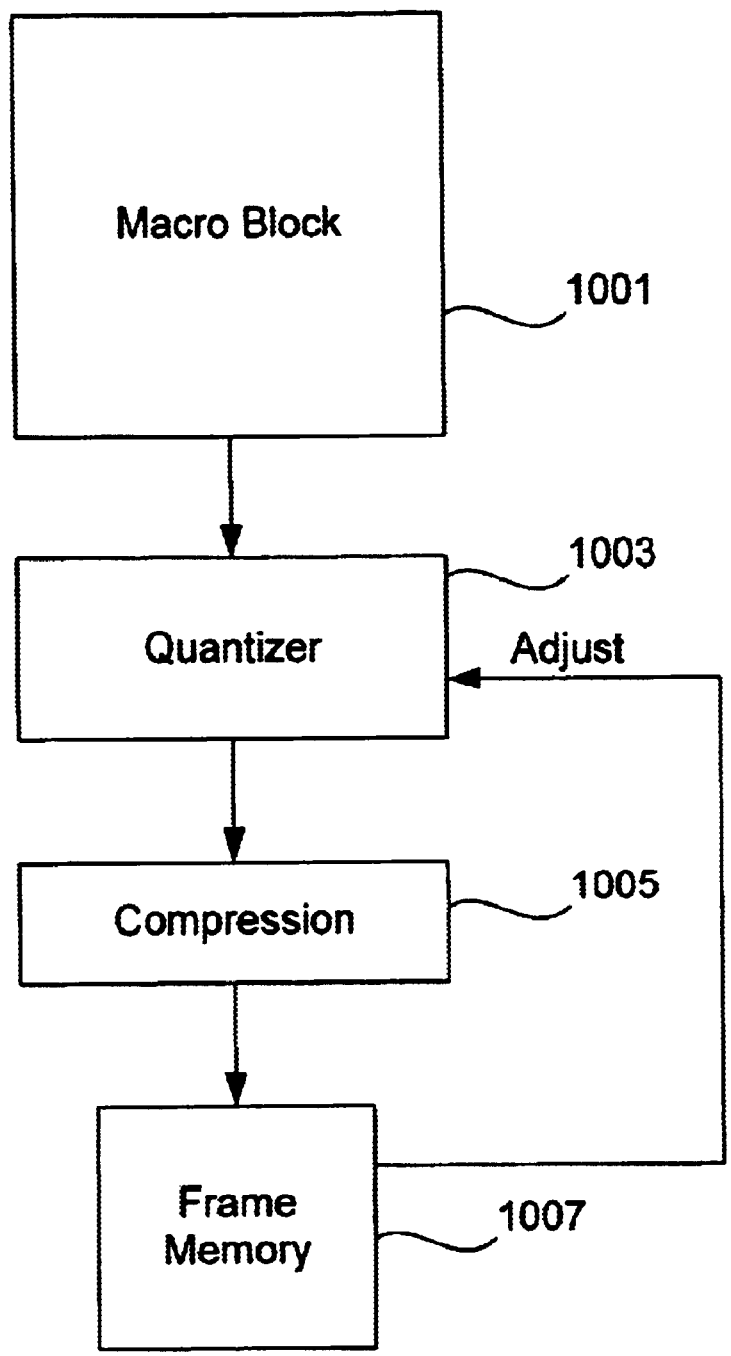
FIG. 10 is a block diagram illustrating an example of a conventional iterative compression and storage of data within the frame memory.

FIG. 10 is a block diagram illustrating an example of a conventional technique for the iterative compression, and the storing of data within a frame memory. In FIG. 10, a macroblock 1001 is coupled into a quantizer 1003. The quantizer is an element that selects how many bits shall represent each element within the macroblock 1001. By adjusting the quantizer 1003, either more or less bits may be utilized to represent the elements of the macroblock. This, in turn, ensures either a larger or smaller amount of compression of the macroblock 1001.

The quantizer 1003 then couples its output into a compression block 1005. The compression block 1005 utilizes compression techniques such as run-length coders and variable-length coders. The resulting compressed data would then be fitted into the frame memory 1007. If the result was such that the data represented by macroblock 1001 would not fit within the frame memory 1007, then the quantizer 1003 would have to be adjusted to yield a greater compression.

The conventional process illustrated in FIG. 10 yielded variable compressions but had the disadvantage of requiring several passes to achieve the required compression. The process also had another disadvantage. For example, when a picture that was composed of many macroblocks was encoded and placed within frame, the amount of compression of these macroblocks could not be predicted accurately. Thus, the compression was variable, depending upon the contents of the initial blocks. It therefore made it very difficult to search for any subpicture elements within the frame memory. The reason for this difficulty is further illustrated in FIG. 11A.

FIG. 11A is an exemplary graphical illustration of a search for a desired block of picture data in a conventional system, versus a preferred embodiment of the present invention as illustrated in FIG. 11B. First, an I or P frame 1101 is represented within an MPEG stream. Also, the desired picture element 1103 is represented within the frame 1101. It is assumed that a prior art process is used to encode the I or P frame 1101 and then insert it within the frame memory 1105 as shown in FIG. 11A. It is also assumed that an embodiment of the present invention is used to encode the I or P frame 1101 and then insert it into the frame memory 1111 as shown in FIG. 11B.

In the prior art system discussed in FIG. 10, in order to find the picture element 1103 within the frame memory 1105 of FIG. 11A, then the entire area that is located prior to the desired block, i.e., the picture element 1103, would first have to be decoded. This prior area to be decoded is represented by the shaded memory area 1107 in FIG. 11A. This entire shaded memory area 1107 would have to be decoded because there is no way predict how far within the block the desired block of the picture element 1103 is located. This is because the amount of compression that can be realized is dependent upon the content of the I or P frame 1101, and upon how it compresses prior to being inserted into the frame memory 1105 of FIG. 11A.

In contrast to the above conventional example of FIG. 11A, an embodiment of the present invention is shown in FIG. 11B. In FIG. 11B, the frame memory 1111 is divided into a series of memory slots 1113. Each individual memory slot 1109 comprises a fixed offset within the frame memory 1111. Therefore, computing the area where the desired block or picture element 1103 resides is now a process of ascertaining the number of blocks that have been encoded within the frame prior to the desired block, and then simply multiplying that number by the fixed offset. This multiplication yields an immediate access to the desired block 1103, because the desired block is now located at a fixed offset within the frame memory 1111 of FIG. 11B. This eliminates the need to decode the memory area that is located prior to the desired block, as was required in the prior art.

Figure 12:
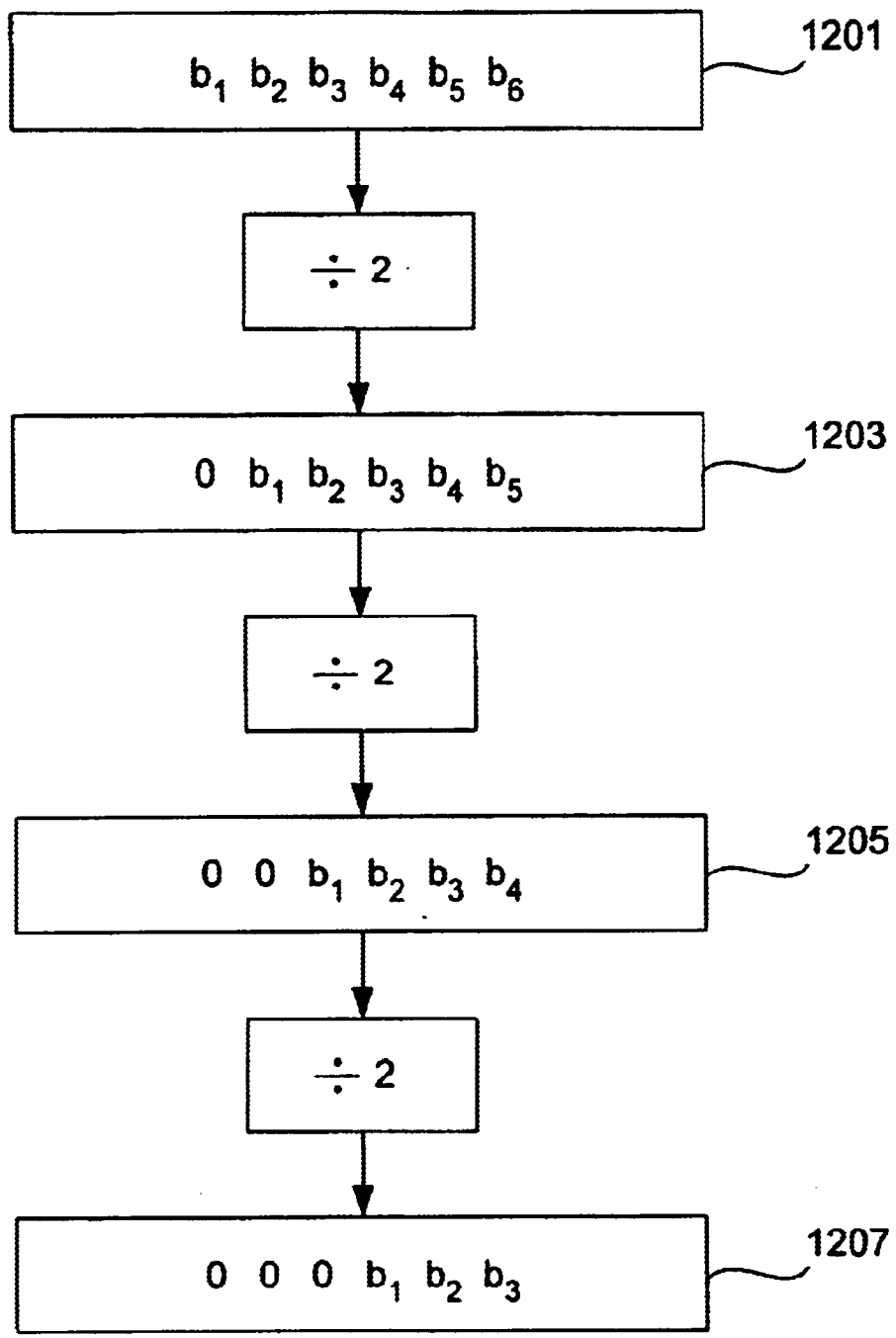
FIG. 12 is an exemplary block diagram of a binary divide by 2 that is implemented in hardware.

FIG. 12 is an exemplary block diagram of a binary "divide by two" technique that is preferably implemented in hardware in another embodiment of the present invention. Embodiments of the present invention may also possess an advantage that may not be readily apparent from the foregoing discussion. For example, in using the "T" transform for the compression of the coefficients within a macroblock, the only mathematical operations that are now performed are the operations of an addition and a divide by four. This is a less complex implementation.

In other exemplary embodiments where the "T" transform may be used, there may be, e.g., an addition, as well as a divide by four, a divide by eight, a divide by two, or a divide by sixteen that is utilized. These operations, of dividing by the various powers of two, are an improved and efficient process, particularly when implemented in hardware. This is because a divide by two can be accomplished in a single clock cycle. Further, any power of two, i.e., $2^n$ where n is an integer, may be utilized, and is be described below.

For example, a divide by four can be accomplished in a single clock period. To understand this, consider the binary number 1201, as illustrated in FIG. 12.

As illustrated in FIG. 12, the binary number 1201 comprises six bits of data, $b_1, b_2, b_3, b_4, b_5$ and $b_6$. In order to divide by two, the process simply shifts all the bits of data so that the new binary number is 0, $b_1, b_2, b_3, b_4$ and $b_5$. Here, $b_6$ is simply discarded. Of course, this leads to a small truncation error, but this shift technique is an extremely fast method of dividing by two. Next, in order to divide by four, the binary number 1203 may again be divided by two. The result would be a binary number 0, 0, $b_1, b_2, b_3, b_4$. Again, some truncation error may be encountered.

If dividing by 8 is desired, then the binary 1205 may again be divided by two, so as to generate the binary number 1207, of 0, 0, 0, $b_1, b_2, b_3$.

In each case, the binary number is simply shifted, and then the lowest order bit is discarded, in order to divide by two again. However, it is understood that this truncation error is somewhat minimized by the fact that the lowest order bit is the one that is always discarded.

Of course, the divide by twos need not be accomplished sequentially. For example, starting with the binary number 1201 of FIG. 12, a binary number 1205 may be generated as a result of dividing the binary number 1201 by four. This division by four may be accomplished by simply shifting two bits in one operation, and then going from the binary number 1201 to the binary number 1205. The ability to divide by four allows the "T" transform computation to operate relatively fast when implemented in hardware. This fast operation is an advantage because of the great amount of data that needs to be handled during the real time manipulation of an MPEG data stream.

FIG. 13 is an exemplary table of a binary number 1300 with a value of 255, that is successively divided by two in a hardware divider. FIG. 13 illustrates a maximum truncation error that would be encountered in dividing by two using a shift, such was described and illustrated in FIG. 12. As shown in FIG. 13, the original binary number 1300 is illustrated where $b_0$ through $b_7$ all have a value of one. Therefore, the original binary number 1300 translates to a decimal (base 10) value of 255.

In FIG. 13, the next binary number 1301 represents the original binary number 1300 after the first divide by two. When the original number 1300 is divided by two utilizing a shift divide, a zero is merely shifted into bit seven ($b_7$) and then the bit seven value is shifted into bit six ($b_6$), the bit six is shifted into bit five ($b_5$), the bit five is shifted into bit four ($b_4$), the bit four is shifted into bit three ($b_3$), the bit three is shifted into bit two ($b_2$), the bit two is shifted into bit one ($b_1$), and finally, the bit one is shifted into bit zero ($b_0$), and thus the bit zero is lost. As can be seen in FIG. 13, after a divide by two using the shift divide method, the first decimal value of 255 has now become a decimal value of 127, corresponding to the binary number 1301.

Next, for the bit number 1303, the original number 1300 has been divided by four or divided twice by two. In other words, bit number 1303 is bit number 1301 with one more bit shift added. Then, the same process of shifting bits to a lower order bit is accomplished in an analogous manner to the previous divide by two for bit number 1301. For example, bit number 1303 is a divide by four of the original bit number 1300, and thus the bit number 1303 is the original number 1300 divided by four. This divide and shift method now results in a decimal value of 63 for bit number 1303.

Bit number 1305 is a further divide by two, in a similar manner, and thus results in a decimal value of 31. Bit number 1307 is a yet further divide by two, in a similar manner, and thus results in a decimal value of 15. Bit number 1309 is yet another divide by two and thus results in a decimal value of seven. Bit number 1311 is a further divide by two that results in a decimal value of three. Finally, bit number 1313 is the final divide by two in this example, that results in a decimal value of one.

In FIG. 13, the original bit number 1300 is essentially divided by 128 to yield the final bit number 1313. In translation, the decimal value of 255 divided by 128 essentially yields a value of one. This example illustrates that as the original number is divided further, the error becomes greater. Because the original bit number 1300 is a binary number that comprises all ones, the table in FIG. 13 illustrates the maximum error that can be realized from utilizing this shift divide method. As illustrated, the divide by two and the divide by four are fairly accurate. However, the divide by 128 introduces a relatively large inaccuracy.

In the aforementioned embodiment of the invention, the transform utilized a divide by four. Dividing by four is effective in hardware because the error introduced is not relatively large, as is understood from the table in FIG. 13. These divides by two and by four, however, can be accomplished in one clock cycle, and thus is the fastest that any operation can be completed. The shift divide method allows the process of transforming the original matrix to be relatively fast. This quick transformability of the "T" transform may be of a great benefit in a high data rate application, such as the above embodiments of video signal compression, and in particular, the aforementioned "T" transform.

The "T" transform results in a hierarchy of data that is achieved by successively compressing the transform that was used to produce the data. Other transforms, such as the Haar transform, may also be used to successively compress a matrix and produce a hierarchy of data. This resulting hierarchy of data is then compressed. It is understood that the transform compressions are preferably a separate step from compressing the results of the transform compressions.

Because the size of the original block of data is N×N bytes, the storage size for this block requires N×N bytes. A user can then specify a compression factor "cf" that is needed for a particular application. By utilizing the compression factor cf, the system then only needs N×N/cf bytes to store the entire data of this block. Thus, for example, if cf=2, then the system will need N×N/2 bytes to store the entire data of the block.

The next step is to calculate a measure of the activity, or "busyness" of the block. The busyness is preferably calculated by summing the absolute value of all of the coefficients in a block. Once the busyness measure has been determined, the required scale factor "sc" is calculated for the block according to the relationship: formula scale factor=surn/divisor[compression factor]+1 Thus, the divisor is 210 for cf=2. The value for the divisor is preferably selected from the experimentally determined array 3000 of:

{X, 600, 210, 105, 210, 210}  (array 3000).

As an example, for a compression where the cf=1, the $1^{st}$ coefficient of 600 is selected from the array 3000. For a compression where the cf=2, the $2^{nd}$ coefficient of 210 is selected from the array 3000 as the divisor value, and similarly, for a compression where the cf=3, the $3^{rd}$ coefficient of 105 is selected from the array 3000, and so forth. It is also understood that X, i.e., the $0^{th}$ coefficient of the experimental array 3000, represents a compression of zero, and thus needs no further definition, due to its lack of usefulness.

Specifically, a scale factor is desired by which all the coefficients may be divided. The purpose is to be able to fit the variable length coded coefficients into the designated storage space. Therefore, given the compression factor that is desired, a divisor is then chosen, and the "sum" is divided by this divisor so as to provide the above scale factor.

Thus, all of the coefficients are divided by this factor and the results are variable length encoded. The fidelity, i.e., the mean-square error, is then measured for the coded data. A range of divisors are examined and calculated for this specific compression factor, and the one that provides the best fidelity is then chosen. One way of examining and calculating this range is to utilize, e.g., a binary search.

Any well known search technique, e.g. any software binary search technique, may be utilized to formulate the above experimentally determined array 3000. The values of the above experimentally determined array 3000 are those chosen to be utilized in a preferred embodiment of the present invention. Other experimentally determined array values may be utilized, depending upon the memory size, quality of video, or the type of video under compression that may be determined by the system designer.

Also, for example, the second value of 600, that is utilized for a compression factor of 1, may be in the range 500–700, and may range even higher for videos that contain a relatively large amount of detail, or lower for videos containing a relatively small amount of detail.

In a preferred embodiment of the present invention, the experimentally determined array 3000 of {X, 600, 210, 105, 210, 210} provides the preferred results for the test cases considered.

Thus, in determining the values of the experimental array 3000, the values are preferably determined in a experimental manner. However, other values may be utilized in the implementation of various embodiments of this invention.

Then, all coefficients in the transformed block are divided by the scale factor as calculated above, except for the DC coefficient, that is located in row 1, column 1, of the transformed matrix. The scale factor for each block is then coded and stored.

Next, the coefficients are written into the video frame memory using the variable-length codes and run-length codes of the data. The tables may be different for different scale factors used in the encoding.

The coefficients are then preferably written into memory in the following order:

| | | | | | | | |
|---|---|---|---|---|---|---|---|
| 0, | 1, | 4, | 5, | 16, | 17, | 18, | 19, |
| 2, | 3, | 6, | 7, | 20, | 21, | 22, | 23, |
| 8, | 9, | 12, | 13, | 24, | 25, | 26, | 27, |

(scanning pattern 4000)

-continued

| | | | | | | | |
|---|---|---|---|---|---|---|---|
| 10, | 11, | 14, | 15, | 28, | 29, | 30, | 31, |
| 32, | 33, | 34, | 35, | 48, | 49, | 50, | 51, |
| 36, | 37, | 38, | 39, | 52, | 53, | 54, | 55, |
| 40, | 41, | 42, | 43, | 56, | 57, | 58, | 59, |
| 44, | 45, | 46, | 47, | 60, | 61, | 62, | 63. | where the $0^{th}$ coefficient is located in row 1, column 1. Thus, the scanning proceeds approximately from left to right and top to bottom according to the above preferred order of the scanning pattern 4000. The scanning finally ends with the $63^{rd}$ coefficient that is located in row 8, column 8.

This writing operation is preferably performed until all the data is written, or the allocated memory is exhausted—whichever happens first. Using this scanning pattern 4000, the lower frequency components are scanned before the higher frequency ones. This, in turn, provides for a better compression quality. This compression quality is improved by scanning the lower frequency components first, because if the memory is exhausted, then the highest frequency components are lost. Losing the highest frequency components is preferred because they are the least noticeable coefficients, thereby least affecting the quality.

The decompression process is also relatively straightforward. Once the stored block that needs to be retrieved has been identified, the location of this stored block may be determined. First, the scale factor is read and then all the variable-length coding ("VLC") parameters are read and decoded. The decoded values are then used to scale and transform the compressed block back into the original N×N block.

Because the transformation preferably only requires operations of addition and/or subtraction, it can be performed very efficiently. The scale factor is preferably an integer in the range of 1–5 and therefore may be performed with only the shift and add operations. In addition, because the size of the compressed block is predetermined, access to the block is convenient. Furthermore, the algorithm guarantees the compressed block will fit in the allocated space.

A major issue for memory reduction techniques is the easy accessibility of data and the simplicity of the compression technique. Both requirements are the result of the need for a fast access to the data. For example, in a retrieval process of a macroblock, up to nine 8×8 blocks may need to be decoded. Therefore, the size of the compressed block is an important element. A tradeoff can be made between the compressed block size, with larger blocks resulting in better compression, but smaller blocks providing easier access. This is because the granularity of access in utilizing smaller blocks requires less data to be retrieved in recreating any analogous macroblock. In addition, a look-ahead process may be utilized to determine which of the decoded blocks should be retained so that the decoding process will not have to be repeated.

Thus, in summary, it is understood for an exemplary preferred embodiment, that the algorithm embodiment essentially guarantees that the coded data will fit into the provided space and thus does not require a rate controller. Also, an embodiment that comprises the block compression technique allows for an easy access to the compressed data at the time of decoding. In this block compression embodiment, no more than four blocks need to be decoded when a block of data needs to be accessed. Also, due to the fixed storage allocation, the access to data is performed easily, and without the need to decode additional data. Finally, the computational complexity of the transform is very low, as it preferably comprises only simple operations, e.g., addition and subtraction.

It will be understood by one skilled in the art that while an MPEG-2 data stream has been utilized in the description of various embodiments of the present invention, that any data stream, whether or not in the MPEG format, may be utilized in various embodiments of the present invention. For example, a DCT-type format data, or any other data format, may also be utilized. Further, the various embodiments of the present invention may comprise an embodiment that includes an apparatus, a system, and/or a method for successively transforming an input data stream. Yet another embodiment of the present invention may instead comprise the successively reverse transforming of a received data stream. Further, yet another embodiment of the present invention may comprise either any or all of the portions of the various embodiments comprising the successively transforming and/or the successively inverse transforming of an input data stream or a received data stream, respectively.

The foregoing description of embodiments of the present invention are described for the purpose of illustration and description of aspects of the invention. It is not intended to limit the invention to the implementations described. The embodiments described are not exhaustive in providing a description of the form and substance of the invention and variations, modifications, and implementations are possible in light of the preceding teachings. It is intended that the invention not be limited by the foregoing description, but instead by the claims appended below.

What is claimed is:

1. An apparatus for processing a data stream, comprising:
   a transform unit for applying a successively compressing data transform to an input data block so as to generate a transformed data;
   a memory device for accepting the transformed data; wherein the memory device further comprises a plurality of divisions within the memory for accepting the transformed data, and wherein each individual division comprises a fixed offset within the memory so that the transformed data may be immediately accessed by ascertaining the number of data that have been transformed and multiplying that number by the fixed offset.

2. An apparatus as recited in claim 1, wherein the plurality of memory divisions are only capable of accepting less data than the original input data block.

3. An apparatus as recited in claim 1, wherein the successively compressing transform comprises a Haar transform.

4. An apparatus as recited in claim 1, wherein the successively compressing transform comprises a T transform, and wherein the T transform operates upon an N×N block size, the T transform further comprising L levels of hierarchical decomposition.

5. An apparatus as recited in claim 4, wherein N is set equal to 8, and L is set to 3.

6. An apparatus as recited in claim 1, wherein the successively compressing transform is computed utilizing operations consisting of at least one of: an addition, a subtraction, a shift operation, a divide by a power of two, and a multiply by a power of two.

7. An apparatus as recited in claim 1, wherein the divisions within the memory comprise a plurality of constant size memory slots.

8. A method for processing data, comprising the steps of:
   calculating a transform to generate a plurality of coefficients,
   calculating a scale factor using a divisor selected from an array that comprises an indication of compression,
   quantizing the coefficients by dividing all coefficients except the discrete cosine by the scale factor,
   scanning a plurality of the quantized coefficients,
   performing at least one of a run-length coding and a variable-length coding on at least a portion of the plurality of scanned coefficients,
   storing a plurality of any resulting variable-length codings obtained from the run-length coding and variable-length coding step.

9. A method as recited in claim 8, wherein any resulting variable-length codings are continually stored.

10. A method as recited in claim 8, wherein the variable-length codings are continually stored until completing at least one of the steps of:
    a) storing all of the variable-length codings to be stored, and
    b) filling to capacity a storage area, that the variable-length codings are being stored in.

11. A method as recited in claim 8, further comprising a decoding portion that comprises the steps of:
    retrieving a plurality of variable-length codings that have been written into a storage area,
    performing at least one of a run-length variable-length coding and decoding so as to obtain a plurality of coefficients,
    decompressing the plurality of coefficients by utilizing the calculated scale factor,
    inverse transforming the plurality of coefficients so as to calculate a data matrix.

12. A method as recited in claim 8, wherein the transform comprises a hierarchical transform.

13. A method as recited in claim 8, farther comprising the step of:
    dividing by 4 when the transform comprises a two-dimensional hierarchical transform of four coefficients.

14. A method as recited in claim 11, further comprising the step of:
    multiplying the transform by 4 when the transform comprises a two-dimensional hierarchical transform of four coefficients.

15. A method as recited in claim 8, wherein calculating a scale factor further comprises the steps of:
    summing the absolute values of the coefficients,
    dividing the sum by the divisor, wherein the divisor is selected from an array comprising {X, 600, 210, 105, 210, 210},
    adding a value of 1 to the result of the division of the sum by the divisor value.

16. A method as recited in claim 8, wherein the scanning of the coefficients step further comprises the steps of:
    scanning the relatively low frequency coefficients, and then
    scanning the relatively high frequency coefficients.

17. A method as recited in claim 8, wherein the coefficient scanning step further comprises the step of: scanning the coefficients in the order of

| 0,  | 1,  | 4,  | 5,  | 16, | 17, | 18, | 19, |
|-----|-----|-----|-----|-----|-----|-----|-----|
| 2,  | 3,  | 6,  | 7,  | 20, | 21, | 22, | 23, |
| 8,  | 9,  | 12, | 13, | 24, | 25, | 26, | 27, |
| 10, | 11, | 14, | 15, | 28, | 29, | 30, | 31, |
| 32, | 33, | 34, | 35, | 48, | 49, | 50, | 51, |

-continued

| | | | | | | | |
|---|---|---|---|---|---|---|---|
| 36, | 37, | 38, | 39, | 52, | 53, | 54, | 55, |
| 40, | 41, | 42, | 43, | 56, | 57, | 58, | 59, |
| 44, | 45, | 46, | 47, | 60, | 61, | 62, | 63. |

18. A method as recited in claim 8, wherein the transform step further comprises the steps of:
   transforming an N×N sized block of data, and
   generating L levels of hierarchical decomposition.

19. A method as recited in claim 18, further comprising the steps of:
   setting N equal to 8, and
   setting L equal to 3.

20. A method for processing a data stream, comprising the steps of:
   performing a successively compressing transform using only addition and binary shifting operations;
   generating a plurality of successively compressed data from the successively compressing transform step;
   storing at least a portion of the successively compressed data.

21. A method as recited in claim 20, further comprising the steps of:
   applying the successively compressed data via a transform unit to an input data block;
   accepting a transformed data from the input data block and storing at least a portion of the transformed data into a memory device; and
   providing a plurality of divisions within the memory for accepting at least a portion of the transformed data, wherein each individual division comprises a fixed offset within the memory so that the transformed data may be immediately accessed by ascertaining the number of data that have been transformed and multiplying that number by the fixed offset.

22. A method as recited in claim 20, wherein the successively compressing transform step further comprises performing a Haar transform.

23. A method as recited in claim 20, wherein the successively compressing transform step further comprises performing a hierarchical T transform.

24. A method as recited in claim 20, wherein the successively compressing transform step further comprises the steps of:
   transforming an N×N sized block of data, and
   generating L levels of hierarchical decomposition.

25. A method as recited in claim 24, further comprising the step of:
   setting N equal to 8, and setting L equal to 3.

26. An apparatus as recited in claim 8, wherein the memory further comprises:
   an allocated storage portion having a size of (N×N)/cf, wherein cf comprises an integer compression factor.

27. An apparatus as recited in claim 26, wherein cf is selected from the set of integers comprising $\{1, 2, 3, 4\}$.

28. A method as recited in claim 20, further comprising the step of:
   storing the N×N size block into an allocated storage having a size of (N×N)/cf, wherein cf comprises an integer compression factor.

29. A method as recited in claim 28, further comprising the step of:
   selecting a value for cf from the set of integers comprising $\{1, 2, 3, 4\}$.

30. An apparatus for processing data, comprising:
   an inverse transform unit for applying a successively decompressing data inverse transform to a received data block, so as to generate an inverse transformed data,
   a memory device for retrieving the retrieved data block to be inverse transformed, wherein the memory device further comprises a plurality of divisions within the memory device for retrieving the received data block to be inverse transformed, wherein each individual division comprises a fixed offset within the memory device so that a desired data block may be immediately accessed by ascertaining the number of data blocks that have been encoded prior to the desired data block and multiplying that number by the fixed offset.

31. An apparatus as recited in claim 30, wherein the successively decompressing inverse transform comprises a Haar inverse transform.

32. An apparatus as recited in claim 30, wherein the successively decompressing inverse transform comprises an inverse T transform, wherein the T inverse transform operates upon an N×N block size, and wherein the T inverse transform further comprises L levels of hierarchical recomposition.

33. An apparatus as recited in claim 32, wherein the memory device further comprises:
   an allocated retrieval portion for retrieving a stored N×N sized block tin an allocated retrieval portion of size (N×N)/cf, wherein cf comprises an integer decompression factor.

34. A method of processing data that comprises the steps of:
   retrieving a plurality of variable length codings that are stored in a storage area,
   performing at least one of a run-length variable coding and decoding so as to obtain a plurality of coefficients,
   decompressing the plurality of coefficients by utilizing a calculated scale factor,
   inverse transforming the plurality of coefficients so as to calculate a data matrix, wherein the decompression and inverse transforming steps are performed using only shift and add operations.

35. A method as recited in claim 34, wherein the inverse transform comprises a hierarchical Haar inverse transform.

36. A method as recited in claim 34, further comprising the step of:
   multiplying the transform by 4 when the transform comprises a two-dimensional hierarchical transform of four coefficients.

37. A method as recited in claim 34, wherein the scale factor is calculated using a divisor selected from an array comprising $\{X, 600, 210, 105, 210, 210\}$, wherein the array comprises an indication of the compression.

* * * * *